(12) United States Patent
Warnick et al.

(10) Patent No.: US 10,317,518 B2
(45) Date of Patent: Jun. 11, 2019

(54) PHASED ARRAY RADAR SYSTEMS FOR SMALL UNMANNED AERIAL VEHICLES

(71) Applicant: BRIGHAM YOUNG UNIVERSITY, Provo, UT (US)

(72) Inventors: Karl Foster Warnick, Spanish Fork, UT (US); Jonathan Cullinan Spencer, Provo, UT (US)

(73) Assignee: Brigham Young University (BYU), Provo, UT (US)

( * ) Notice: Subject to any disclaimer, the term of this patent is extended or adjusted under 35 U.S.C. 154(b) by 338 days.

(21) Appl. No.: 15/215,333

(22) Filed: Jul. 20, 2016

(65) Prior Publication Data

US 2018/0011180 A1    Jan. 11, 2018

Related U.S. Application Data

(60) Provisional application No. 62/194,633, filed on Jul. 20, 2015.

(51) Int. Cl.
*G01S 7/35* (2006.01)
*H01Q 3/34* (2006.01)
(Continued)

(52) U.S. Cl.
CPC ............. *G01S 13/06* (2013.01); *G01S 7/352* (2013.01); *G01S 13/32* (2013.01);
(Continued)

(58) Field of Classification Search
CPC .... G01S 13/9303; G01S 13/867; G01S 13/87; G01S 2013/0245; G01S 13/06;
(Continued)

(56) References Cited

U.S. PATENT DOCUMENTS 5,451,961 A * 9/1995 Rubin ................... G01S 7/2923
342/159
7,474,262 B2   1/2009 Alland
(Continued)

OTHER PUBLICATIONS

Charvat et al., "Chapter 3: Frequency Modulated Continuous Wave (FMCW) Radar", Small and Short-Range Radar Systems, 2014, pp. 69-75.
(Continued)

*Primary Examiner* — Olumide Ajibade Akonai
(74) *Attorney, Agent, or Firm* — Brake Hughes Bellermann LLP

(57) ABSTRACT

Phased array radar systems for unmanned aerial vehicles (UAVs) are disclosed. A disclosed example radar apparatus for a small UAVs includes a transmitter to transmit a transmit signal in the X-band, a receive phased array including at least two receive antennas, wherein the receive phased array provides a field-of-view of at least 100 degrees in a first direction and at least 20 degrees in a second direction perpendicular to the first direction, a first processor programmed to determine a location of an object based on an output from each of the at least two antennas, a second processor programmed to perform collision avoidance based on the location of the object, and a mount to mechanically couple the radar apparatus to the UAV.

17 Claims, 21 Drawing Sheets

(51) Int. Cl.
| | |
|---|---|
| G01S 13/02 | (2006.01) |
| G01S 13/06 | (2006.01) |
| G01S 13/32 | (2006.01) |
| G01S 13/93 | (2006.01) |
| H01Q 13/08 | (2006.01) |
| H01Q 21/06 | (2006.01) |
| B64C 39/02 | (2006.01) |

(52) U.S. Cl.
CPC ........... *G01S 13/9303* (2013.01); *H01Q 3/34* (2013.01); *H01Q 13/085* (2013.01); *H01Q 21/064* (2013.01); *B64C 39/02* (2013.01); *B64C 39/024* (2013.01); *B64C 2201/027* (2013.01); *G01S 2013/0245* (2013.01)

(58) Field of Classification Search
CPC .......... G01S 13/32; G01S 7/352; G01S 13/86; G01S 19/03; G01S 13/522; G01S 7/414; H01Q 21/064; H01Q 13/02; H01Q 1/28; B64C 39/024; B64C 2201/027; B64C 39/02

See application file for complete search history.

(56) References Cited

U.S. PATENT DOCUMENTS

| | | | | |
|---|---|---|---|---|
| 9,625,907 | B2* | 4/2017 | Hu | G08G 5/0069 |
| 9,716,309 | B1* | 7/2017 | ElSallal | H01Q 5/00 |
| 2007/0252748 | A1* | 11/2007 | Rees | H01Q 1/28 342/29 |
| 2007/0273572 | A1* | 11/2007 | Thomas | F42C 13/042 342/68 |
| 2009/0109083 | A1* | 4/2009 | Tietjen | G01S 13/28 342/91 |
| 2010/0121574 | A1* | 5/2010 | Ariyur | G05D 1/101 701/301 |
| 2012/0092208 | A1* | 4/2012 | LeMire | G01S 13/87 342/29 |
| 2014/0139366 | A1* | 5/2014 | Moses | G01S 13/9303 342/27 |
| 2014/0222246 | A1 | 8/2014 | Mohamadi | |
| 2014/0333475 | A1* | 11/2014 | Sierwald | G01S 13/95 342/26 R |
| 2015/0009081 | A1* | 1/2015 | Hulsmann | G01S 7/03 343/753 |

OTHER PUBLICATIONS

Charvat et al., "Chapter 6: Phased Array Radar", Small and Short-Range Radar Systems, 2014, pp. 185-216.
Itcia et al., "FMCW Radar for the Sense Function of Sense & Avoid Systems onboard UAVs", Proceedings of SPIE, vol. 8899, 5 pages.
Kemkemian, et al., "Radar Systems for "Sense and Avoid" on UAV Operating Frequency and Tradeoffs", International Radar Conference—Surveillance for a Safer World, Oct. 12-16, 2009, 6 pages.
Shi et al., "Multichannel Sense-and-Avoid Radar for Small UAVs", 32nd Digital Avionics Systems Conference, 2013, 10 pages.
Carnie et al., "Image Processing Algorithms for UaV "Sense and Avoid"", Proceedings of IEEE International Conference on Robotics and Automation, 2006, 6 pages.
Eck, James Arthur, "Compact Antennas and Arrays for Unmanned Air Systems", Brigham Young University Scholars Archive, 2014, 67 pages.
Mitomo et al., "A 77 GHz 90 nm CMOS Transceiver for FMCW Radar Applications", IEEE Journal of Solid-state Circuits, vol. 45, No. 4, Apr. 2010, pp. 928-937.
Ayhan et al., "FPGA controlled DDS based Frequency Sweep Generation of High Linearity for FMCW Radar Systems", Jan. 2012, 4 pages.
Kwag et al., "UAV based Collision Avoidance Radar Sensor", IEEE International Geoscience & Remote Sensing Symposium, Jul. 23-28, 2007, 4 pages.
Kemkemian et al., "MIMO Radar for Sense and Avoid for UAV", IEEE International Symposium on Phased Array Systems and Techology, Oct. 12-15, 2010, 8 pages.
Kemkemian et al., "A Wide Field of View Radar for Sense and Avoid on UAV using Space coloring Waveforms", Proceedings of the 7th European Radar Conference, 2010, pp. 220-223.
Moses et al., "Radar-Based Detection and Identification for Miniature Air Vehicles", IEEE International Conference on Control Applications, Sep. 28-30, 2011, pp. 933-940.
Contarino, Mark, "Report : TASK 3.1—Review and Analysis of Available System Technology Options and Justification for System Selection", All Weather Sense and Avoid System for UASs, Dec. 5, 2009, 68, pages.
Wojtkiewicz et al., "Two-Dimensional Signal Processing in FMCW Radars", XXth National Conference on Circuit Theory and Electronic Networks, vol. 2, Oct. 1997, 6 pages.
Spencer, Jonathan Cullinan, "A Compact Phased Array Radar for UAS Sense and Avoid", Brigham Young University Scholars Archive, 2015, 107 pages.
Sahawneh et al., "Airborne Radar-Based Collision Detection and Risk Estimation for Small Unmanned Aircraft Systems", Brigham Young University, 2015, 25 pages.
Mackie et al., "Compact FMCW Radar for a UAS Sense and Avoid System", IEEE Antennas and Propagation Society International Symposium, Jul. 2014, pp. 989-990.
Mackie, James David, "Compact FMCW Radar for GPS-Denied Navigation and Sense and Avoid", Brigham Young University Scholars Archive, 2014, 62 pages.
Niedfeldt, Peter C., "Recursive-RANSAC: A Novel Algorithm for Tracking Multiple Targets in Clutter", Brigham Young University Scholars Archive, 2014, 194 pages.
Sahawneh et al., "3D Path Planning for Small UAS Operating in Low-Altitude Airspace", International Conference on Unmanned Aircraft Systems, Jun. 7-10, 2016, pp. 413-419.

* cited by examiner

PHASED ARRAY RADAR SYSTEMS FOR SMALL UNMANNED AERIAL VEHICLES

RELATED APPLICATION

This application claims the priority of U.S. Provisional Patent Application No. 62/194,633, entitled "Compact, Low Cost Phased Array Radar for Unmanned Air System Detect and Avoid Applications," filed on Jul. 20, 2015, the entirety of which is incorporated herein by reference.

FIELD OF THE DISCLOSURE

This disclosure relates generally to unmanned aerial vehicles (UAVs), and, more particularly, to phased array radar systems for small UAVs.

BACKGROUND

Radio detection and ranging (radar) systems reflect electromagnetic or radio waves off objects in order to learn something about them. Radar systems can use echoes to determine the distance between the object and the observer, the velocity at which the object is traveling, or physical properties of the object like its shape or material makeup.

SUMMARY

In a general aspect, compact, low-cost phased array radar systems that can be mounted on a UAV in the small unmanned aerial system (UAS) weight class (<25 kg (kilograms) are disclosed. The disclosed radar systems are among, if not the, smallest fully portable phased array radar systems that implement full digitally-steered receive beamforming together with a collision and avoidance system. Disclosed examples have a form factor that allows them to be fit on or be mounted to small UAVs, and can be operated using a battery. It is believed that the disclosed radar systems have produced some of the first live flight results that provide sufficient range and angle data on a small UAV (<25 kg) using an onboard radar.

In some examples, radar systems include a real-time correlator and beamformer. In some examples, a co-planar waveguide (CPWG) Wilkinson splitter that implements an efficient equal split is included. In some examples, an intermediate frequency (IF) filter that reduces phase noise introduced by coupling between the transmitter and the receiver is included. In some examples, an IF filter reduces the required dynamic range of the radar system by compensating for distance related echo attenuation. A clutter rejection filter based on the Levinson algorithm reduces background clutter in some examples.

In another general aspect, a radar apparatus for a small UAV includes a transmitter to transmit a transmit signal in the X-band, a receive phased array including at least two receive antennas, wherein the receive phased array provides a field-of-view of at least 100 degrees in a first direction and at least 20 degrees in a second direction perpendicular to the first direction, a first processor programmed to determine a location of an object based on an output from each of the at least two antennas, a second processor programmed to perform collision avoidance based on the location of the object, and a mount to mechanically couple the radar apparatus to the UAV.

In yet another general aspect, a radar apparatus for a small UAV includes a transmitter to transmit a transmit signal using a carrier signal having a frequency in the X-band, a digitally-steered receive phased array having four receive antennas, one of the receive antennas having a conductor with a dimension based on at least one-half the wavelength of the carrier signal, a first processor programmed to determine a location of an object based on outputs of the four receive antennas, a second processor programmed to perform collision avoidance based on the location of the object; and a mount to mechanically couple the radar apparatus to the UAV.

DETAILED DESCRIPTION

Figure 1:
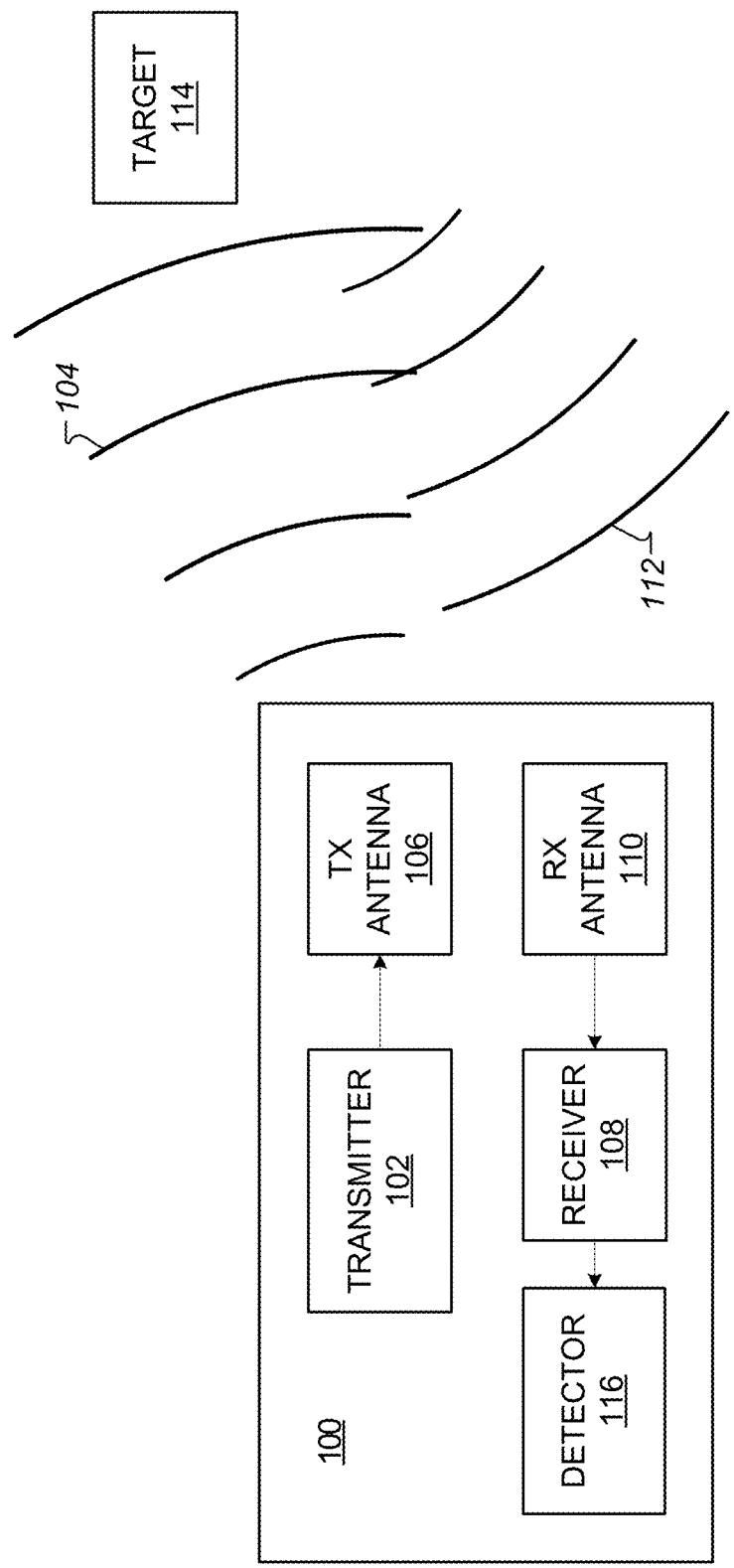
FIG. 1 is a block diagram of an example radar system in accordance with this disclosure.

While used by the military for the past decade, unmanned aerial vehicles (UAVs) have just recently become widely available to civilians as consumer goods. Since then, small UAVs have become widely sought after and widely purchased by civilians. The sudden popularity of UAVs, and the threat they represent to the public and aviation generally, has spurred the Federal Aviation Administration (FAA) into action. Reports of recreational UAVs interfering with regular air traffic are increasing. In fact, the number of registered UAVs has eclipsed the number of piloted aircraft, from Cessnas to Dreamliners. Millions of recreational UAVs buzz the skies, forcing the FAA to hurry out safety rules before serious accidents occur. Current FAA rules require UAVs to remain within line-of-sight, either of an operator on the ground or in a chase vehicle. Such rules are distinctly contrary to retailers who desire to deliver goods via UAVs and, for business efficiency, need to operate them beyond line-of-sight. Consumer UAVs are also viable solutions to many problems of scale, including search and rescue, pipeline surveillance, agriculture, disaster site exploration, etc., but require operation beyond line-of-sight. In order for UAVs to integrate smoothly into current manned air traffic, they must have a way of reliably avoiding collision with current air traffic and other UAVs. It is expected that the FAA will not relax current rules until safe flight beyond line-of-sight can be proven and made practically feasible in the consumer marketplace. To date, collision avoidance systems for UAVs able to safely operate beyond line-of-sight have not been possible. Conventional collision avoidance systems are too large, heavy, power hungry and prohibitively expensive for consumer UAVs. The ability to operate safely beyond line-of-sight is a significant unmet need in the UAV industry.

It was unexpectedly discovered that UAV applications do not require the performance normally implemented by radar systems. Having made this realization, example disclosed radar systems (e.g., radar system 100 shown in FIG. 1, radar system 200 shown in FIG. 2, etc.) were conceived and realized that meet the requirements of UAV applications (e.g., reduced range, small targets, etc.), and enable significant reductions in complexity, size, weight, etc. Detection range and sensitivity depend on the smallest and fastest targets that need to be detected and tracked. Statistical models of aircraft flight paths can be used to generate an ensemble of encounter scenarios between small UAVs and a variety of intruder aircraft, from small drones to large manned aircraft. For these scenarios, a detailed model of the phased array radar antenna beams can be used to predict the response of the radar on the UAVs to the intruder aircraft. To make it more realistic, the model can include noise and ground clutter. Although traditional radar systems used for precision localization and mapping use phased arrays with hundreds of antennas, the simulations unexpectedly showed that four-element phased arrays with low transmit power provide adequate information about intruders to allow UAVs to compute an avoidance path and maintain probability of collision below usual accepted risk thresholds.

By making certain design tradeoffs, it was found, surprisingly, that useful collision avoidance for small UAVs can actually be done with digital beamforming systems within the size, weight, power, and cost requirements of UAV-borne radar systems. The simulated encounter scenarios showed that for small UAV sense and avoid, the formed beams can be relatively coarse (as wide as 20-30 degrees). Wide, coarse beams translate to small phased arrays with a low number of antennas. This means that the phased arrays need only have a small number of antennas (e.g., four), in contrast to a large scale phased arrays, which may have hundreds or thousands of antennas.

Another size reducing attribute is the use of frequency modulated continuous wave (FMCW)-based radar with beamforming on receive, and not on transmit. Digital beamforming on transmit would require that the digital processor handle a bandwidth equal to the bandwidth of the radar pulse, which would be large, expensive and impractical to mount on a small UAV. With FMCW-based radar, the received pulses from targets are electronically mixed with the transmit pulse to produce a narrowband signal with frequency proportional to the distance to the target. This mixed signal is much narrower in bandwidth than the transmit pulse, and an analog to digital converter with sample rate of 1 Msamp/sec or slower can be used. Therefore, it was advantageously found that four receive antennas in an array, and sampling the four signals and forming beams digitally can be used for small UAVs using a very small, compact digital processing system.

These discoveries and realizations enable the novel radar systems for UAV applications disclosed herein. An unexpected discovery is that the digital-steered receive phased arrays disclosed herein is feasible for small UAV applications.

Compact, low-cost phased array radar systems for UAVs that meet the needs of, for example, the UAV industry, manned air traffic and the FAA are disclosed herein. The disclosed systems are unique to the industry because never before have phased antenna arrays, and signal processing platforms been realized together as a platform available for consumers in a form factor capable of being flown on a small UAV. Typically, phased arrays are 1 to 2 feet in size, which well exceeds the size of small UAVs. Disclosed radar systems (e.g., radar system 100, radar system 200, etc.) (excluding antennas) have been made to weigh less than 120 grams (g), and to have an approximate size of a whiteboard eraser (e.g., 2.25 inches×4 inches×1 inch). Thus, the disclosed radar systems easily meet the payload requirements of small (and large) UAVs.

For example, using antennas with a gain of 12 decibels (dB) and 800 milliWatts (mW) of transmit power, the disclosed radar systems can provide a field-of-view (FOV) of at least 120°×30°, and detect a radar cross section of less than 0.1 square meters ($m^2$) up to 150 meters away. While examples of the disclosed radar systems provide a field of view of approximately 110°×30°, radar systems (e.g., radar system 100, radar system 200, etc.) according to this disclosure may be made to have other FOVs. For instance, a FOV may be narrower, wider, rear-looking, 360°, etc. The disclosed radar systems are capable of tracking multiple targets at the same time in real-time. Such disclosed radar systems have been demonstrated as capable of detecting extremely small UAVs, and are scalable to further ranges and larger targets (e.g., commercial airplanes). Thus, the disclosed radar systems also meet the necessary detection and collision avoidance requirements in a low-cost, compact radar system that can be readily mounted to small UAVs. Accordingly, the disclosed systems meet the need felt by UAV owners, manned aircraft, the FAA, and users of UAVs for commercial purposes (e.g., goods delivery, etc.).

Figure 13:
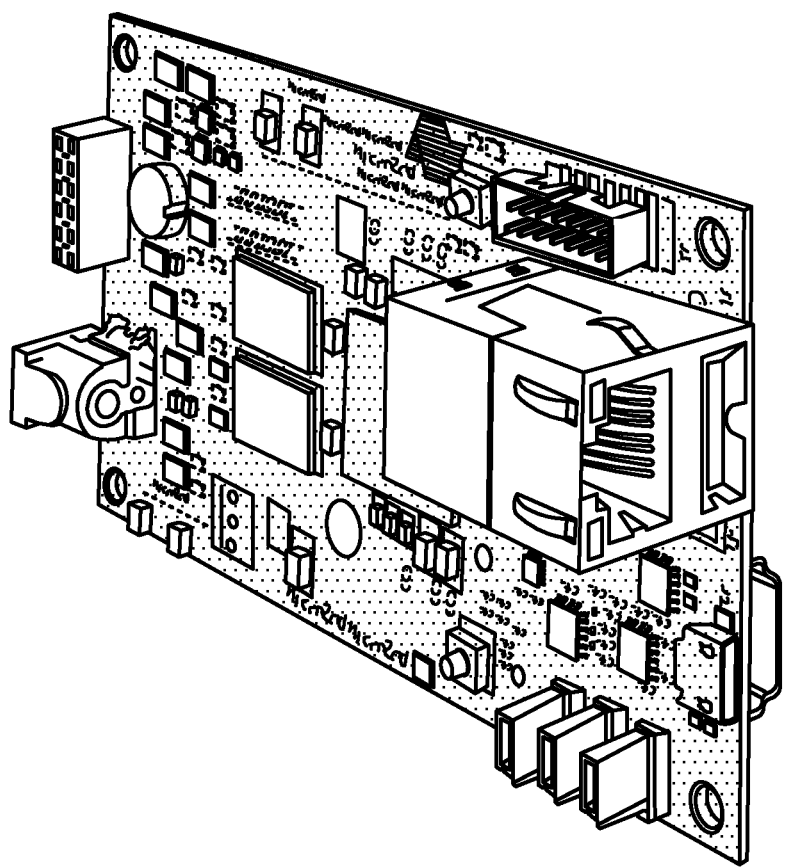
FIG. 13 is an image of a prototype digital board for the example prototype radar system of FIG. 3.

Conventional radar systems consume far more power than is available on small UAVs. Typically, the addition of a digitally-steered phase array increases the power consumption of the digital processing portion of a radar system. Realizing that UAV applications do not require long ranges or fine resolutions, it was discovered that a coarse beam (e.g., 20° to) 30° is sufficient for UAVs (including collision avoidance). Accordingly, fewer channels (e.g., fewer antennas) are needed and a lower bandwidth receiver can be utilized while still meeting the requirements of radar systems for small UAVs. By lowering the bandwidth, the power consumption of the digital processing was dramatically reduced to where it can be realized on a small, compact, low cost, commercially available development board (see FIG. 13, for example). Further power savings could be realized via further integration.

A function of the disclosed systems (e.g., radar system 100, radar system 200, etc.) is to provide to user locations (e.g., angle and distance) to any target within a specified maximum range. An application for these systems is to be mounted onboard a UAV. In that case, the targets would be other UAVs in the air or other obstacles (e.g., airliners, trees, pedestrians, etc.) that the UAV needs to avoid. Such a system, where a radar system is coupled with a collision avoidance algorithm, which may be referred to as a Sense and Avoid (SAA) or Detect and Avoid (DAA) system is made possible by the examples disclosed herein. Another possible application is for the system to be placed on the ground in either a stationary configuration or on a mechanically rotating platform. In this setup, the radar system can provide a user with aerial awareness of any UAV traffic inside a specified distance bubble of a few kilometers (km) in all directions and above it. In this case, the targets would be any air traffic with which the UAV might interfere. The system could either provide this data to the UAV DAA system for autonomous operation, or it could provide the data to a UAV pilot to alert the pilot of conflicting air traffic. This mode of operation would provide the pilot with a safe zone of flight where they would be assured that they could operate their UAV without any risk of interfering with other UAVs or commercial manned air traffic.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

FIG. 1 is a schematic block diagram of an example radar system 100 in accordance with this disclosure. The example radar system 100 uses echolocation via electromagnetic, or radio waves as the mechanism for detecting obstacles or targets. The example radar system 100 of FIG. 1 includes a transmitter 102 to transmit a signal 104 via a transmit antenna 106. A receiver 108 receives via a receive antenna 110 an echo 112 of the transmitted signal 104 that bounces off or is reflected by a target 114. A detector 116 determines the distance to the target 114 based on the time delay between when the signal 104 is transmitted and when the echo 112 is received. Once the delay time is known, the distance to the target 114 can be calculated using the known speed (speed of light) of the wave. For short range UAV applications (e.g., distance <1 to 2 kilometers (km)), the example transmitter 102 transmits FMCW signals. When transmitting FMCW signals, the transmitter 102 predictably changes (modulates) the frequency of the transmit signal 104 as a function of time. The FMCW signals described herein can provide the detection radius applicable to UAV applications with high accuracy in a small, low-cost radar system.

When the target's echo 112 is received, the receiver 108 compares the current transmit frequency of the transmitter 102 and the frequency of the received echo 112. The farther the distance to the target 114, the greater the difference in frequency will be between the transmitter 102 and the receiver 108. This mode of operation allows for detection of targets that are both near and relatively far away, depending on how the transmitter 102 modulates the frequency of the transmitted signal 104. In some of the examples disclosed herein, the radar system 100 enables a user to selectively change characteristics of the FMCW signals depending on a desired range of target detection.

An example FMCW signal is a chirp signal characterized by a carrier frequency of 10.25 GHz, a chirp bandwidth of 500 MHz (e.g., the amount that chirp signal varies from 10.25 GHz), and a chirp period of 4.096 ms (e.g., length of each chirp). Currently, the FAA mandates a see and avoid FOV of approximately 30°×120° for manned aircraft. Using the FAA's mandated FOA, a carrier frequency of 10 GHz results in a planar antenna of approximately 1 centimeter (cm) by 5 cm. These dimensions are sufficiently small (e.g., largest dimension of a radar system of <5 inches) for UAV applications. If instead a carrier frequency of 1 GHz is used, the size of the antenna increases to approximately 12 cm×50 cm, which is too large for UAV applications. The size of the antenna being based on, at least in part, ½ the wavelength of a sinusoid at the carrier frequency (e.g., 1.5 cm for a 10 GHz signal). The 10.25 GHz carrier frequency provides for a range of 1-2 km, which is the distance at which propagation and atmospheric absorption begin to degrade signals. While the range can be increased by using a lower frequency, lowering the frequency results in an antenna size that is too large. While the use of higher frequency carrier waves can detect smaller targets, it reduces range, which makes them inapplicable for consumer use. Thus, taking into account at least these practical requirements for UAV based radar systems; a 10.25 GHz carrier provides a balance of the various tradeoffs. The 10.25 GHz carrier frequency also allows the disclosed radar systems to operate in the bandwidth allocated by the FCC for radiolocation, which is often used by modern radar systems.

The example chirp frequency can be selected to strike a balance between a narrower bandwidth (decreases cost, and improves efficiency and noise) and a wider bandwidth (range resolution—required distance between objects to discriminate them). Because UAVs operate close to the ground where there is more ground clutter, a chirp frequency of 500 MHz can be used to better distinguish objects, which uses the entire width of the radiolocation band.

The example chirp period is selected based on a desired detection range. A chirp period of 4.096 ms provides detection of targets at 2 km. However, the disclosed systems allow the chirp period to be selectively changed, allowing a user to selectively adjust the detection range. For example, while a chirp period of 2.048 ms results in a shorter detection range, faster objects can be tracked. In some examples, the chirp period is chosen so the number of samples in a frame is a power of two.

Figure 2:
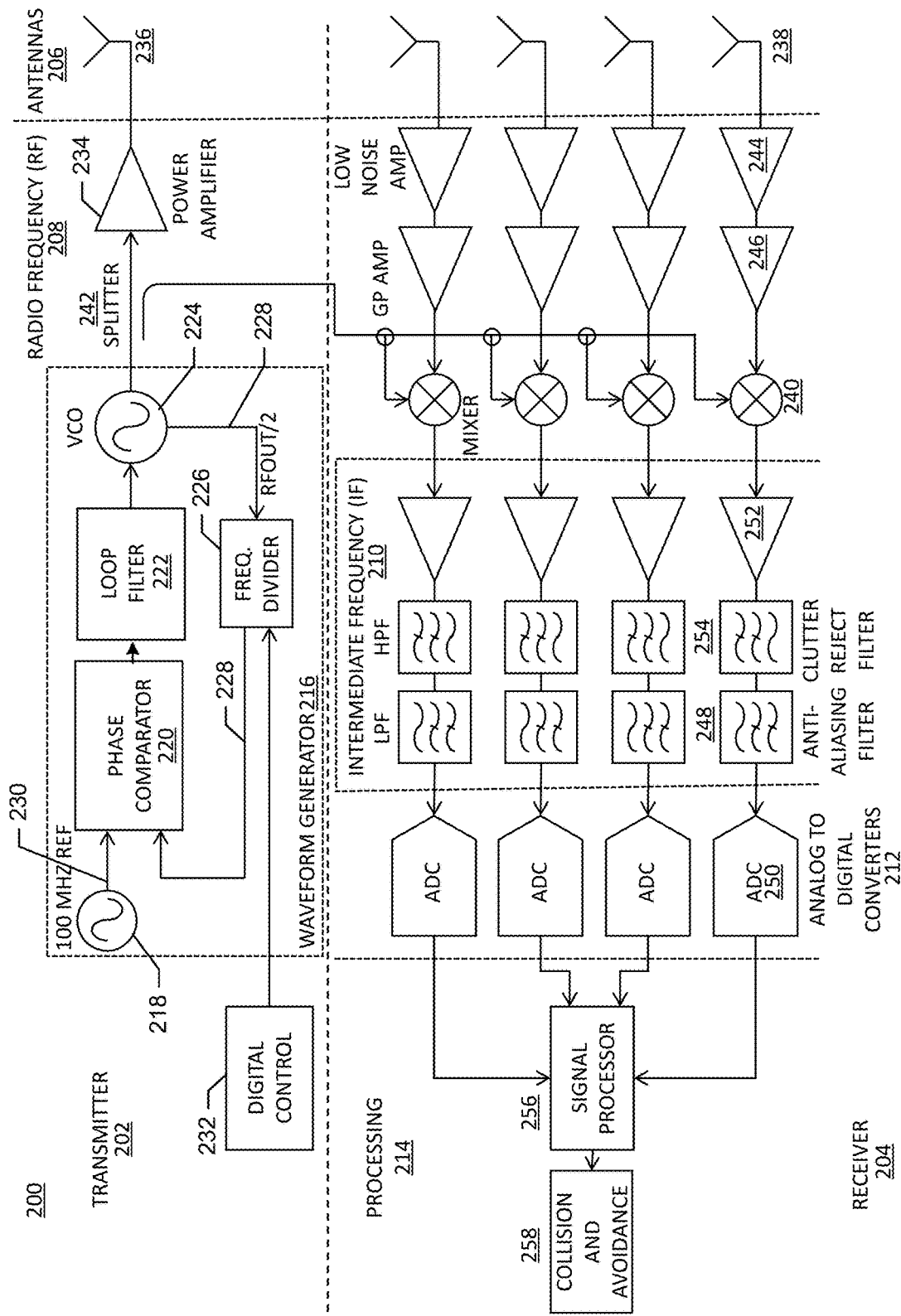
FIG. 2 is a schematic block diagram of an example radar system in accordance with this disclosure.

FIG. 2 is a schematic block diagram of an example radar system 200 in accordance with this disclosure. As shown, the example radar system 200 includes a transmitter 202 and a receiver 204. In the illustrated example of FIG. 2, the radar system 200 is also partitioned into an antenna sub-system 206, an RF sub-system 208, an IF sub-system 210, an interface sub-system 212, and a processing sub-system 214.

Figure 3:
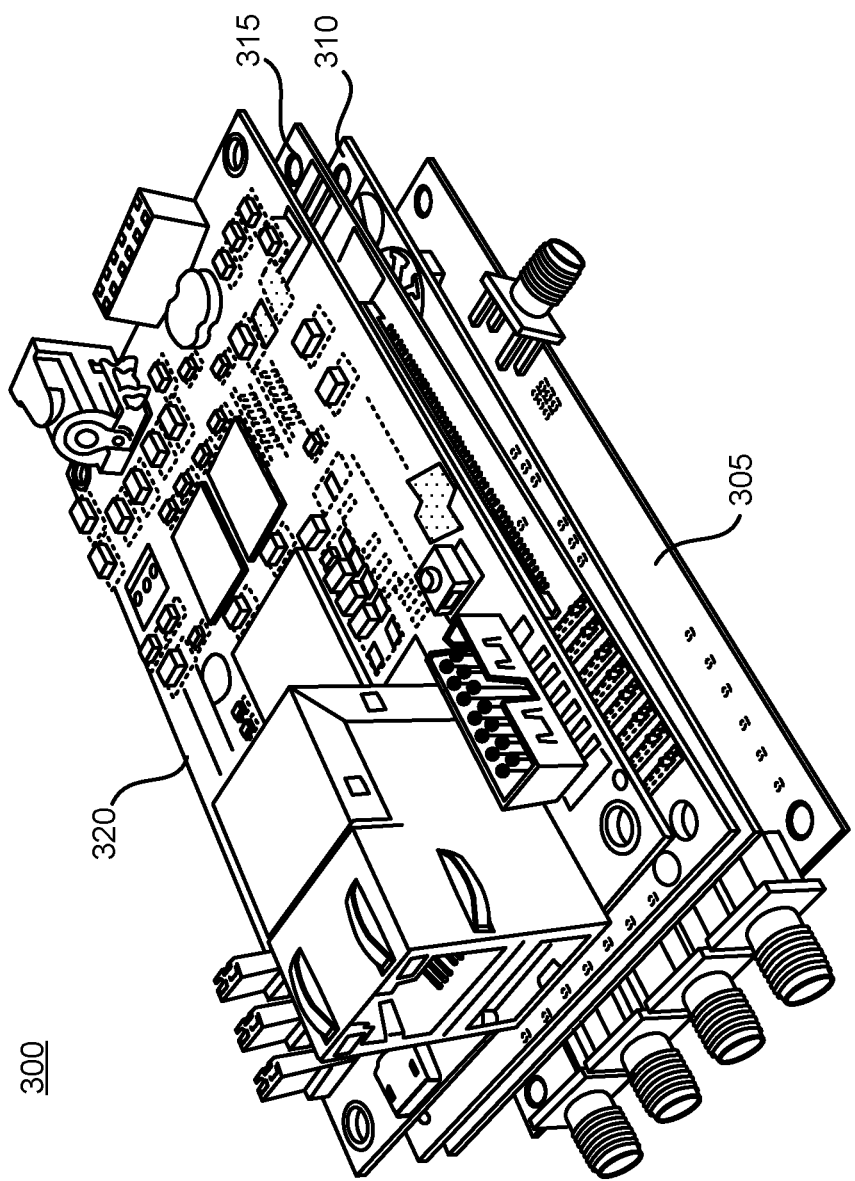
FIG. 3 is an image of a prototype radar system in accordance with this disclosure.

FIG. 3 is an image of an example prototype radar system (except for antenna sub-system 206) in accordance with the teachings of this disclosure that may be used to implement the example radar system 200 of FIG. 2. The example prototype radar system 300 of FIG. 3 includes an RF board 305 corresponding to the RF sub-system 208, an IF board 310 corresponding to the IF sub-system 210, an interface board 315 corresponding to the interface sub-system 212, and a processor board 320 corresponding to the processing sub-system 214.

Returning to FIG. 2, to generate FMCW signals, the example transmitter 202 includes a waveform generator 216. The example waveform generator 216 of FIG. 2 has five blocks that are connected to form a phase locked loop (PLL): a reference oscillator 218, a phase comparator 220, a loop filter 222, a voltage controlled oscillator (VCO) 224, and a frequency divider 226. The example waveform generator 216 generates FMCW waveforms directly at radio frequencies. While an example waveform generator 216 is shown in FIG. 2, other waveform generators may be used. Other example waveform generators include, a DDS, a tuned oscillator Starting with the frequency divider 226, the example frequency divider 226 of FIG. 2 divides down the output 228 of the VCO 224 by a factor of 100, for a chirp waveform varying between a base frequency of 10 GHz and a maximum frequency of 10.5 GHz (i.e., a 10.25 MHz center frequency and a chirp bandwidth of 500 MHz). The example phase comparator 220 of FIG. 2 compares the divided down output 228 of the frequency divider 226 with the output 230 of the reference oscillator 218. If the divided down VCO output frequency is lower than the frequency of the reference output 230, the phase comparator 220 applies a positive voltage to the VCO 224 through the loop filter 222, and the VCO 224 adjusts to match the frequency of the reference oscillator 100 MHz. The loop filter 222 determines how quickly the VCO 224 will lock to the reference output 230 and how stable it will be once it gets there.

The example frequency divider 226 of FIG. 2 is a Fractional-N frequency divider. The frequency divider 226 can selectively divide the output 228 of the VCO 224 by different divisors (e.g., integers). Changing the divisor results in different frequency outputs from the VCO 224. Because the phase comparator 220 locks to the output 228 of the frequency divider 226 to force the equality $$f_{ref} = \frac{f_{VCO}}{N},$$

any desired VCO output frequency can be created by changing the divisor. A divisor of N=100 forces an output frequency of 10 GHz. A divisor of N=99 forces an output frequency of 9.9 GHz. The system generates a frequency sweep by making small, fast adjustments to the division ratio.

Figure 4:
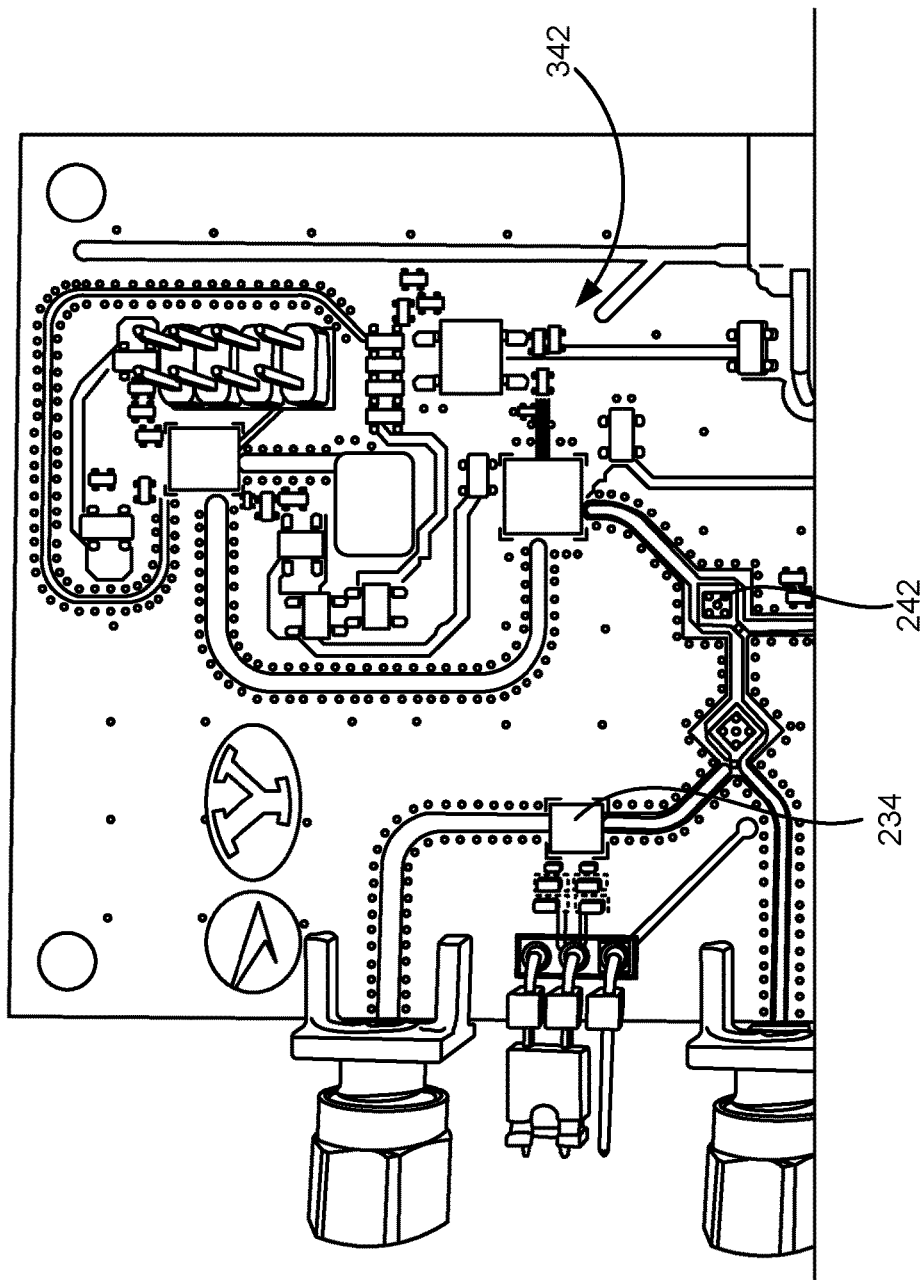
FIG. 4 is an image of a transmit portion of a prototype radio frequency (RF) board for the example prototype radar system of FIG. 3.

FIG. 4 is an image of the transmitter portion of the RF board 305 of FIG. 3, which includes the waveform generator 216, the amplifier 234 and a splitter 242.

The example transmitter 202 includes digital control 232 to control the waveform generator 216. Among other things, the digital control 232 controls the divisor used by the frequency divider 226 and enables users to configure parameters of FMCW generation, such as carrier frequency, chirp bandwidth, chirp period, etc. In some examples, the digital control 232 is implemented by the processing sub-system 214.

In some instances, the output power of the VCO 224 is 5 decibel-milliwatts (dBm). As necessary, to boost transmit power, the transmitter 202 may include a power amplifier 234. The power amplifier 234 may be implemented by a power amplifier (see left side of FIG. 4) on the RF board 305 (see FIG. 3). Alternatively, the power amplifier 234 may be a higher powered external power amplifier (see FIG. 8). An example onboard power amplifier is the HMC451 amplifier sold by Analog Devices Inc. An example off-board power amplifier is the HMC952 amplifier sold by Analog Devices Inc.

Figure 6A:
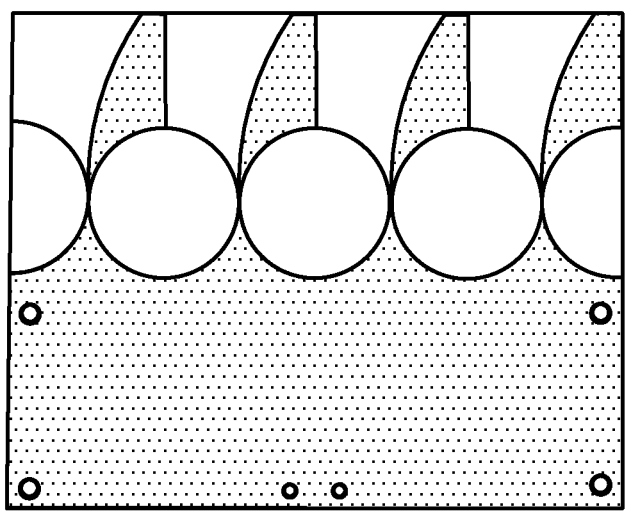
FIGS. 6A and 6B are front and back views, respectively, of an example antenna in accordance with this disclosure.
Figure 6B:
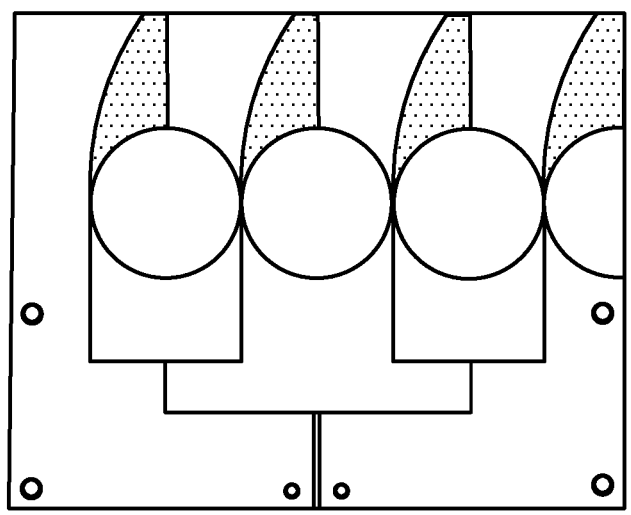

To radiate transmit signals, the transmitter includes a transmit antenna 236. The transmit antenna is a 4×1 planar endfire Vivaldi antenna (see FIGS. 6A and 6B). FIG. 6A is a front view of the antenna 236, and FIG. 6B is a rear view of the antenna 236. In some examples, printed circuit board (PCB) antennas are used because they can be fabricated with precision and at a lower cost than other types of antennas. Endfire design antennas provide for aerodynamic antennas, which makes them suitable for UAV flight. The 4×1 array pattern was chosen to provide a desirable field of view (e.g., 100°×20°) for aerial use.

Because an antenna operates similar to a microphone, it can only detect a signal in its field of view, but has no way of determining the direction from which the signal arrived. To overcome this problem, a phased array antenna having several independent antennas in a line or a grid is used in examples disclosed herein. When a radio wave emanating from a source arrives at the grid of antennas, its time of arrival will be slightly different from one antenna to the next. The antennas closest to the source will receive the signal first, and the rest of the antennas will receive it with a predictable delay time that is a function of the angle of the source and the spacing of the elements. Because the signal being transmitted is known to be a sine wave, the short time delay between arrivals at the elements ends up being a phase delay in the sinusoid, which can be used to determine angle of arrival. A phased array relies on processing the signals from multiple antennas, each with broad radiation patterns, to form one or more narrow beams. Beamforming can be done in analog electronics or digitally. Analog electronics requires phase shifters, which are too expensive for use in low-cost UAV radar systems. Conventional digital beamforming with a standard phased array requires a very large, expensive processor with high power consumption.

Turn now to the receiver 204. The example receiver 204 of FIG. 2 is implemented as a Homodyne system where the transmit signal (i.e., output of VCO 224) is used as the local signal for downmixing respective received waveforms. As shown in FIG. 2, the Homodyne system of FIG. 2 uses separate antennas for transmit and receive. The Homodyne architecture of FIG. 2 enables the radar system 200 to be made compact, which is important for UAV applications. Other architectures may be used, some of which may come at the expense of compactness. Because a Homodyne architecture meets the requirements for UAV-based radar, it was used in some disclosed example radar systems.

To couple some of the transmit signal to mixers (one of which is designated at reference numeral 240) of the receiver 204, the radar system 200 includes a plurality of splitters, one of which is designated as splitter 242. In the example of FIG. 2, all of the splitters are the same. An example splitter 242 of FIG. 2 is a Wilkinson power divider with an equal power split (see FIGS. 4 and 5). An example Wilkinson power divider has matching λ/2 segments with characteristic impedance $Z_0\sqrt{2}$. In some instances, the Wilkinson power divider in realized in CPWG.

Figure 7:
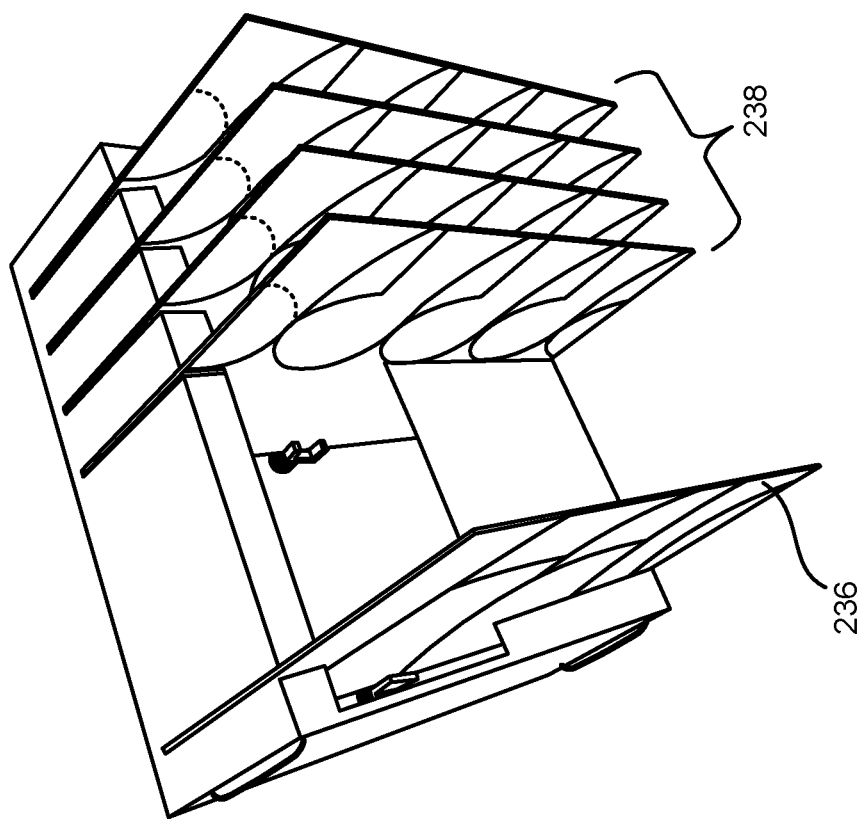
FIG. 7 is an image of a prototype antenna array in accordance with this disclosure.

To receive signals, the example receiver 204 includes an array 238 of receive antennas. By using an array 238 of receive antennas, the receiver 204 can determine both range to target and direction to target. In some examples, the antennas used in the antenna array 238 are the same as the transmit antenna 236. FIG. 7 illustrates an antenna assembly 700 including the array 238 of receive antennas together with the single transmit antenna 236. The antennas 236 and 238 can be swapped out at any time in order to achieve different system characteristics. The antenna assembly 700 pictured in FIG. 7 contains the single transmitting antenna 236 and the receiver antenna array 238. The transmitting and receiving antennas may be stored in a single assembly 700 as seen in FIG. 7 or in separate assemblies, one for the transmit antenna 236 and one for the array 238 of receive antennas. An example distance between the transmit antenna 236 and the receiving antennas is 7.5 cm, but it can be adjusted based on convenience to accommodate the geometry of a UAV. An example inter-antenna spacing of the receive antennas is 1.5 cm, and may correspond to the wavelength of operation. An example height of the antenna assembly 700 is 12 cm, fixed by the size of the Vivaldi antenna elements. An example depth of the antenna assembly is 10 cm, but can also be adjusted to accommodate the geometry of the UAV. The example antenna assembly 700 is useful for fixed-wing type UAVs, where it could be mounted so the antennas are angled aerodynamically into the direction of flight. For a multi-rotor type UAV, the antenna system 700 could be implemented using a compact planar patch antenna array approximately 6 cm×6 cm The example receiver 204 of FIG. 2 includes a portion of the RF sub-system 208 and the IF sub-system 210. The example RF-subsystem 208 of FIG. 2 down converts RF outputs of respective ones of the receive antennas to an intermediate frequency. The RF sub-system 208 establishes a noise figure, reduces coupling between receive channels, and applies a gain to compensate for downconversion losses. In some examples, low noise amps (one of which is designated at reference numeral 244) are implemented using the AMMP-6222 amp sold by Avago Technologies (see FIG. 9). General purpose amples (one of which is designated at reference numeral 246) provides additional amplifications but does not have to be as low of noise as the low noise ampls 244.

The mixers 240 down convert respective RF output signals of the receive antenna array 238. An example mixer 240 is the MAC-12GL+ mixer sold by Mini Circuits (see FIG. 9).

Figure 10:
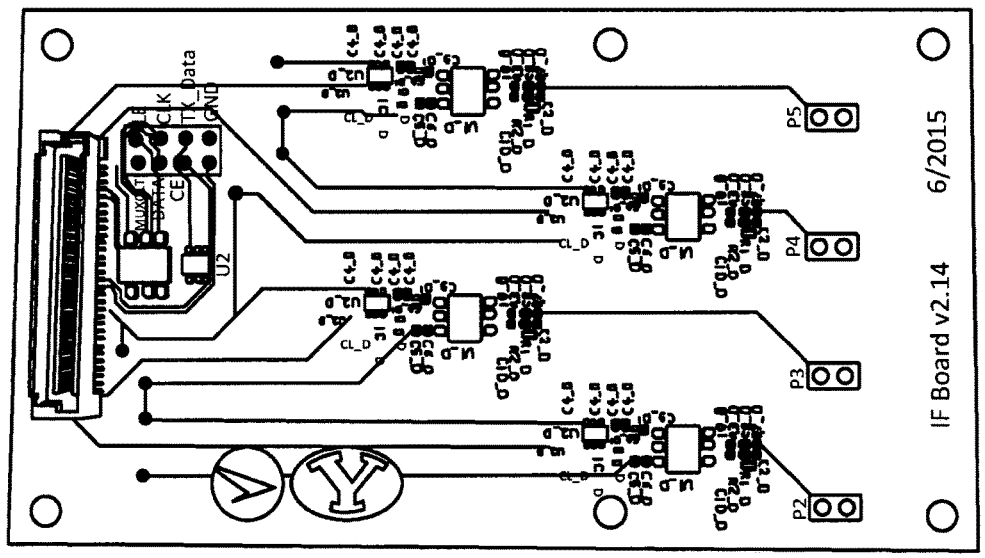
FIG. 10 is an image of a prototype IF board for the example radar system of FIG. 3.

The IF sub-system 210 includes anti-aliasing filters (one of which is designated at reference numeral 248) for the analog-to-digital converters (ADC) (one of which is designated at reference numeral 250). The IF sub-system 210 also includes amplifiers (one of which is designated at reference numeral 252) to amplify the signal as necessary for digitization. The example IF sub-system 210 further includes clutter rejection filters, one of which is designated at reference numeral 254. FIG. 10 is an image of a prototype of the example IF-subsystem 210.

Received signal power is inversely proportional to the distance to the fourth power. This equates to a 40 dB/decade increase in received power as a target approaches the radar. An example clutter rejection filters 254 is a two-pole high-pass filter (HPF) with an equal and opposite slope. By applying the clutter rejection filters 254, targets will appear to have the same amplitude as they approach the radar system 200. Because the primary amplitude fluctuation of the receiver 204 is due to changes in range, the clutter rejection filters 254 eliminate that difference and reduce the necessary ADC dynamic range considerably. An issue with coupling and close-up clutter is that because their effective range is so small, they have a large received power that swamps other targets. By implementing the clutter rejection filters 254, the effects of coupling and close clutter returns are mitigated so that they appear to have a similar amplitude as other target returns.

In practice, a 40 dB/decade rise corresponds to a two-pole HPF. In an example, those poles are controlled by the values of DC-blocking capacitors C8 and C10 in FIG. 11. Since these are both real valued poles, the corner of the filter is not sharp, and it takes about a decade for the filter to transition into the 40 dB/decade slope.

An example anti-aliasing filter 248 is based on a Sallen-Key filter topology, and is a two-pole low-pass Bessel filter with linear phase response in order to improve the time domain response. With a sample rate is 2 Msamp/sec, the filter cutoff frequency is 1 MHz. Because the natural falloff of the radar amplitude due to the $1/r^4$ relationship is 40 dB/decade, the anti-aliasing filter 248 has an effective falloff of 80 dB/decade, providing adequate anti-aliasing filtration.

The example array 238 of antennas shown in FIG. 2 can be used to implement a phased array antenna that is able to look in a particular direction by applying a phase shift (or beam weight) to the output of each antenna, and then summing the outputs of all the antennas together. With a phased array antenna, the antenna array can be kept stationary, but the antenna beam can be scanned in many directions as the beam weights applied to the array are changed. In some examples disclosed herein, an advanced type of phased array implements what is called digital beamforming. Beamforming refers to the operation of applying beam weights and summing, because after those operations are performed, the antenna has formed a single beam in the direction of interest. For a standard phased array antenna, the beamforming operation is performed using physical circuits resulting in a single output to be digitized. In digital beamforming, all the antenna outputs are digitized independently and the beamforming is applied in software. Since the beamforming operation is applied digitally, the system can form multiple beams at the same time. This method of digital beamforming provides even greater superiority over a mechanically steered antenna because it allows the radar to form many beams at the same time, and hence, look in multiple directions simultaneously.

To date, digitally steered phased arrays have been considered unfeasible, cost prohibitive and/or impractical for consumer applications, let alone for small consumer UAVs. The radar systems disclosed herein represent a breakthrough by making digitally steered phased arrays technically feasible and economic for small UAVs. Some disclosed radar systems implement a four-channel digitally steered phased array that can be connected to any configuration of antennas for any type of beamforming. This was a surprising breakthrough in that it was generally accepted that more than four elements are required for radar systems for UAVs. That is, it was not believed that the broad, coarse beams disclosed herein and, hence, the coarse angular resolution provided herein by only four antennas would work satisfactorily. However, it was found that four antennas, coarse beams and coarse resolution are suitable for UAV applications.

Figure 14:
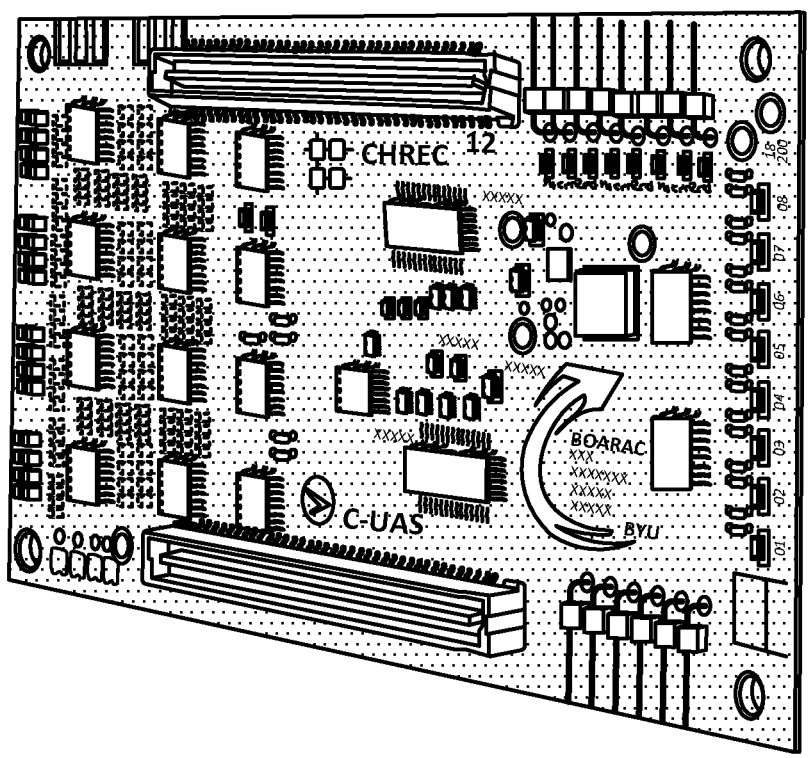
FIG. 14 is an image of a prototype interface board for the example prototype radar system of FIG. 3.

To convert the analog outputs of the IF sub-system 210 into digital samples that can be processed by the processing sub-system 214, the receiver 204 includes the plurality of ADCs 250. An example ADC 250 is a 12-bit converter sampling at 2 million samples/sec (Msamp/sec). FIG. 14 is an image of a prototype of the interface board 315 of FIG. 3 that implements 8 ADCs (see upper portion of FIG. 14), and provides an interface to the IF board 310 of FIGS. 3 and 9, and to the processor board 320 of FIGS. 3 and 13.

Figure 12:
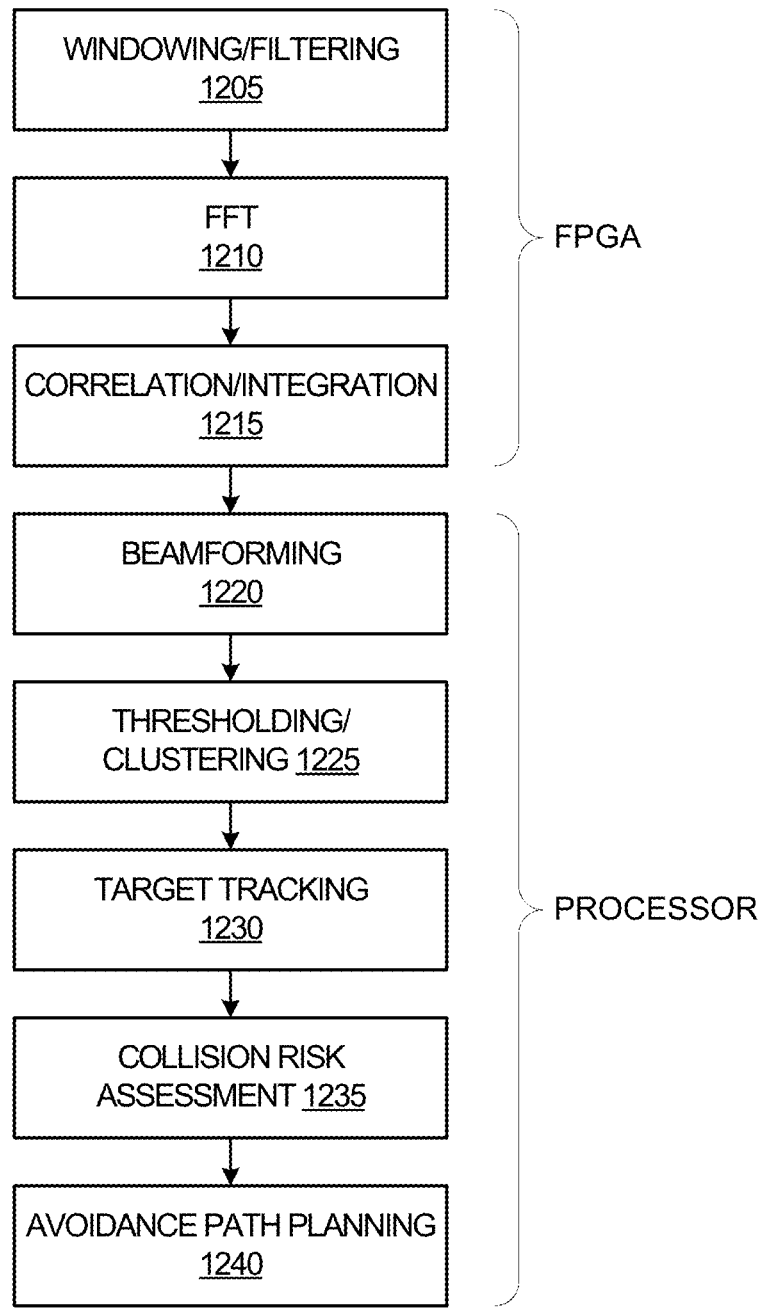
FIG. 12 is a schematic block diagram of the processing performed by the processor board of FIG. 3.

FIG. 12 illustrates an example processing framework 1200 implemented by the signal processor 256 (e.g., a field-programmable gate array (FPGA)) of FIG. 2 and the collision and avoidance processor 258 (e.g., a general-purpose processor). The processing framework shown in FIG. 12 may be referred to the back-end processing of the radar system 200. The processing framework 1200 is implemented by the processor board 320. The core functionality of the processor board 320 is to extract the target location information from all of the digitized data from the array 238 of antennas. The amounts of data involved in digital phased array radar processing are actually quite large. In order for a system to be able to handle digital beamforming for four antenna channels requires a processing system that is able to process 250 Mbits/second of data continuously. The disclosed radar systems accomplish using an FPGA and a general purpose processor. An FPGA is a form of customizable processor. In disclosed examples, the FPGA is used to perform the data intensive operation of beamforming, which outputs a "radar picture" of the scene. An example processor board 320 is Microzed™ by ZedBoard. It features a Xilinx Zynq®-7000 Soc processor/FPGA that can implement both the signal processor 256 and the collision and avoidance processor 258.

In some examples, blocks of collected samples are synchronized with chirps of the transmit signal. For example, given a sampling rate of 2 Msamp/sec, and a chirp period of 2.048 ms, each block contains 4096 samples.

As shown in FIG. 12, a window or filter may be applied to the collected block of samples (block 1205). Example window functions reduce side lobes of the sinc function and/or reduce scalloping loss. An example filter reduces clutter. Clutter is unwanted radar reflections off of ground, vegetation, and buildings. Sometimes clutter itself is the signal of interest. Generally, however, clutter occurs when the antennas are oriented such that either the main lobe or one of the side lobes is at least partially angled at the ground. Stationary clutter has a coherent structure that allows it to be removed by a pre-whitening filter. A pre-whitening filter is a way of subtracting out a constant background in a way that allows for slight amplitude and phase variations. An example clutter reducing filter is implemented by recording some background data and generating an autocorrelation sequence from the recorded time-domain data. Then, using a compression tool such as the Levinson algorithm for speech, the autocorrelation sequence is converted to a set of digital filter coefficients that are used to invert the clutter response and remove it from future data. For clutter rejection when the radar is in motion, pre-whitening is more involved, and requires updating the filter coefficients often.

The Fourier Transform used in the disclosed systems is an $N_{FFT}$-point fast Fourier transform (FFT). After a full frame of samples (e.g., 4096 samples) is loaded into a buffer and optionally multiplied by a window function or filtered, the data is loaded into an FFT module (block 1210). For 12-bit ADCs operating at a frequency of $f_{samp}$=2.03 Msamp/sec, each channel has an input data rate of 3 MBps, or 12 MBps for all four channels. The FFT is performed for each channel independently. In some examples, each 4096-point FFT can be performed in 165 μs, leaving additional time before the next frame of data given a chirp interval of 2 ms.

At block 1215, correlation is applied to increase the separation between signal and noise by comparing the outputs of the antennas. Correlation is not required, but serves to reduce noise. Correlation and integration are described at length below and, thus, will not be described further here.

Beamforming (block 1220) extracts direction of arrival information from the correlation matrices formed at block 1215 to form a range/angle image of the radar system's FOV, and applies image processing techniques in the estimation of target locations. The image is comprised of a set of equally spaced beams in angle for every range bin. Beamforming is described below at length and, thus, will not be described further here.

At block 1225, discriminations between signal and noise are made. Because most noise variation occurs on range data, thresholding is perform on a single range-indexed vector that combines the inputs from all antennas. Thresholding is described below at length and, thus, will not be described further here.

After thresholding, target tracking is performed (block 1230) using the Recursive Random Sample Consensus Algorithm (R-RANSAC) developed by Peter C. Niedfeldt, as a way to track multiple targets in the presence of clutter. The R-RANSAC algorithm works by creating a number of models that fit new data with groupings from past data over a specified time window. At each time step, the models are passed through a Kallman filter to predict the future state. If the new data fits the prediction of any models, those models are updated to include the new data. If the new data does not fit any of the models, a new model is formed by randomly selecting several past points and performing a linear extrapolation between the new data point and each of the randomly selected points. The quality of each potential model is determined by the inlier ratio: the number of past points that fit the model within a certain threshold. The randomly generated model is added to the set of existing models. The set is ordered according to the inlier ratio of each model, and the model with the lowest inlier ratio is removed from the set. Models that have been alive past a certain threshold and have the required inlier ratio are passed to the output as valid target tracks. The R-RANSAC algorithm performs well in systems with a low probability of detection by maintaining a long active window so that many measurements can be missed without discarding a good model.

After radar return is deemed to be a valid target, the system determines if the intruder actually imposes a collision risk (block 1235). This assessment is made using the planned trajectory of the primary aircraft and the estimated trajectory of the intruder. In one method, the intruder's future location is estimated by using linear extrapolation and the closest point of approach is calculated. If the closest point of approach falls within a certain safety threshold, the scenario is flagged as a collision course, and avoidance maneuvering is initiated. Another method uses a probabilistic model of the intruder location, rather than a linear extrapolation. The probabilistic model creates a sort of spatial PDF of where the intruder might fly in the future based on the uncorrelated encounter model developed by MIT Lincoln Laboratory and the flight dynamics of the aircraft in question. An assessment of the probability of collision is determined by how much the primary aircraft overlaps the intruder PDF at the closest point of approach. The probability of collision is continuously evaluated, and if it exceeds a threshold, then an avoidance maneuver is executed. Although the probabilistic method requires more computation than the linear extrapolation method, it offers an improvement in the overall probability of correctly detecting a collision.

Avoidance path planning (block 1240) can be accomplished by using a graph search algorithm. The algorithm divides the space into a three-dimensional grid of locations where it can travel. At each time step, a cost function is assigned to each of the closest nodes. The cost function includes the cost of traveling the distance to that node, the cost of deviating from the original course, the cost of assuming a trajectory that will increase collision risk, and the cost of being close to the intruder. The system chooses the node that minimizes cost at every time step. If the node discretization is coarse, then the planned avoidance path may be somewhat clunky, and it can be passed through additional processing to create a smooth flight path.

The following describes an example design process, example design criteria and an example radar system for small UAVs. These examples do not limit the scope of coverage of this patent.

Example radar systems for small UAVs are disclosed by Jonathan Cullinan Spencer in his Masters Thesis entitled "A Compact Phased Array for UAS Sense and Avoid" (Brigham Young University, Nov. 1, 2015, BYU Scholars Archive. Paper 5837. Available at http://scholarsarchive.byu.edu/etd), the entirety of which is incorporated herein by reference.

Radar System Design

The detection scenario presented by UAVs is the short-to-medium range (~1 km) detection of small airborne targets ($\sigma_{RCS}$<1 m) from either a ground-based or aerial platform. This section describes the analog and RF design of the radar transceiver and how it applies to the detection of small UAVs.

Parameter Selection

Although the design of a radar system entails dozens of small decisions, there are a few key parameters that have a large effect on the way that the transmitter and receiver function. Some of these are flexible and can be changed with a few lines of code, while changing others would entail a complete re-design of the system. The major system parameters are listed below in Table 1. This section provides a brief discussion of some of the key parameters and their associated trade-offs.

These bands are free for use by industrial, scientific, and medical (ISM) industries, provided that users abide by certain limitations. Other bands, while not commercialized, are reserved for certain purposes, such as radiolocation or radionavigation. In deciding on the frequency of operation of a radar system, the engineer may analytically determine an approximate choice, but make the final decision based on the closest legally available band. In many cases, the navigation of the Federal Communications Commission (FCC) regulations may prove more difficult than the design of the system itself.

The relationship between the carrier frequency, propagation loss, and the antennas can be seen by analyzing the standard radar equation presented in Eq. (1A). Another form of this equation is given in terms of the effective aperture area of the transmitting and receiving antennas $A_t$ and $A_r$ using the aperture gain substitution $G=4\pi A/\lambda^2$ to give $$P_r = \frac{P_t A_t A_r \sigma_{RCS}}{(4\pi)^3 R^4 \lambda^2}. \tag{1}$$

In the gain form of the radar equation, $$\boxed{P_r = \frac{P_t G_t G_r \lambda^2 \sigma_{RCS}}{(4\pi)^3 R^4 L_s}}, \tag{1A}$$

$\lambda$ is in the numerator, implying that an increase in frequency results in a decrease in received power, all else held constant. However, in the aperture form of the radar equation, Eq. (1), the opposite is implied. This discrepancy is understood by observing what is being held constant. When the antenna gain is held constant and the frequency is increased, the antenna can shrink in size. When the effective antenna aperture area is held constant and the frequency is increased, the antenna stays the same size, but the gain of the antenna and possibly its complexity increase.

Which viewpoint is more useful? It depends on the application. In the case of designing a sensor, it is most practical to assume that the gain is a fixed variable. This is because the application often dictates a required field of view. Because antennas have an approximate inverse rela-

TABLE 1

Radar Transceiver Parameters

| | Value | Parameter | Value |
|---|---|---|---|
| Size | 2.25 in × 4 in × 1 in | Weight | 120 g (0.26 lbs.) |
| Consumed Power | 8 W | Carrier Frequency | 10.25 GHz |
| Transmitted Power ($P_t$) | 5 mW | Chirp Bandwidth ($B_{RF}$) | 500 MHz |
| Chirp Period ($T_c$) | 2.048 ms | IF Bandwidth ($B_{IF}$) | 1 MHz |
| System Noise FIG. (F) | 6 dB | ADC sample rate | 2 Msamp/s |
| Range Resolution | 0.3 m | Maximum Range | 614 m |

Carrier Frequency

The choice of carrier frequency affects the physical size of the system and its antennas, the cost of manufacturing, and the propagation losses of the signal. The choice of carrier frequency may end up being the one over which the engineer has the least control. The electromagnetic spectrum is finite, and telecommunications companies spend billions of dollars for the right to use different parts of it. There are certain parts of the spectrum that are designated as "unlicensed" bands.

tionship between field of view and gain, by constraining the system to a fixed field of view the designer is essentially fixing the gain of the antennas regardless of the frequency of operation. There is another practical reason why it is more appropriate to maintain a fixed antenna gain. In the case of reflector and horn antennas almost any aperture size can be realized; however for small, low cost applications, antennas are generally planar systems integrated on a PCB or integrated circuit (IC). Most planar antenna designs consist of a collection of individual elements that are combined into a single input using a feed network. A planar antenna can be viewed as an aperture antenna with the same approximate physical area, but there is a physical limit on how large the planar antenna can be made. The larger the planar antenna, the more complex the feed network can be, which in some cases renders the design unrealizable. In addition, the size of the feed network is a function of the substrate thickness more than the frequency of operation, so as the frequency increases and the elements shrink the feed network remains the same size and adds additional loss.

Tied to the carrier frequency and antenna selection is the field of view. For manned aircraft the FAA mandates a "see and avoid" field of view of approximately 30° by 120° degrees. This results in an approximate antenna gain of 10 dB. The approximate planar antenna size needed to realize this field of view and gain can be determined by treating the planar antenna as a rectangular aperture. The relationship between gain and aperture area is given by $$\Delta\theta = 50.76 \lambda / D \quad (2)$$

$$G = (32383 \text{ deg}^2)/(\Delta\theta\_el \Delta\theta\_az) \quad (3)$$

where $\Delta\theta$ is the half power beam width in degrees for a given dimension, D is the length in meters of the aperture for a given dimension, and G is the gain of the aperture.

At 1 GHz, the antenna would measure 12 cm×50 cm. At 10 GHz, 1.2 cm×5 cm, and at 100 GHz, approximately 0.12 cm×0.5 cm. This analysis shows that, given the field of view requirements imposed by the FAA, any system with an operating frequency much lower than 10 GHz would result in antennas that present a payload too large for most UAVs. Thus, for small UAVs, the required beam widths and available payload size imposes a soft lower limit on the frequency of operation at approximately 10 GHz.

Figure 15:
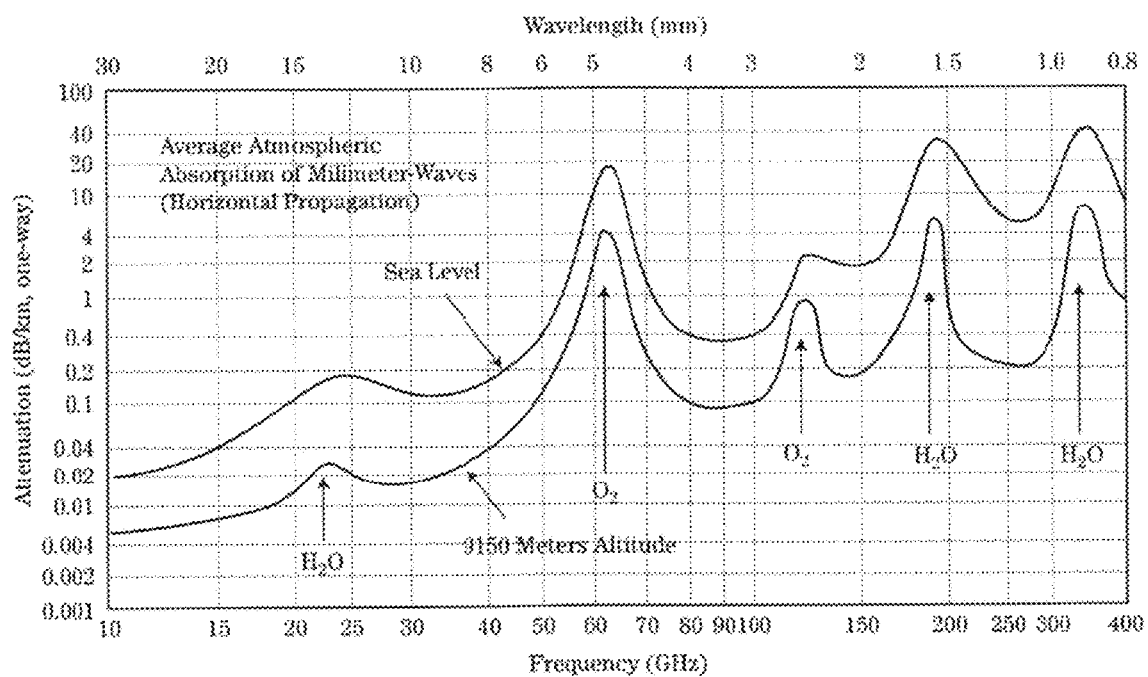
FIG. 15 is a graph showing a gaseous attenuation of electromagnetic waves in the air due to oxygen and hydrogen.

In addition to the propagation losses incurred at higher frequencies as predicted by Eq. (1A), there are also additional losses incurred by the atmosphere at higher frequencies. The total loss is a combination of gaseous attenuation from oxygen and water vapor, attenuation due to rain, and attenuation due to clouds. FIG. 15 is a graph showing an example gaseous attenuation of electromagnetic waves in the atmosphere due to oxygen and hydrogen. The gaseous attenuation shown in FIG. 15 demonstrates that lower frequencies are more favorable for avoiding atmospheric attenuation. Although radar can penetrate clouds and rain, there is also attenuation associated with both of those, which follows the same general trend of an upward increase with frequency. The attenuation is a function of distance traveled in the medium, usually dB/km.

In short range applications where the radar maximum range is only a few meters, a high frequency is desirable because it allows for miniaturization and integration of the antennas. This application dictates a maximum range of 1-2 km, a distance where propagation effects and atmospheric absorption begin to degrade the signal. Target RCS is also a strong function of frequency. As a general rule, radio waves only produce strong backscatter when the size of the target is equal to or larger than the wavelength of operation. High frequency systems can see small targets that low frequency systems may not. It should also be noted that the prices of system components and test equipment also follow a general upward trend with increasing frequency.

The examination of free space path loss, propagation effects, and manufacturing costs demonstrated that a radar system for UAV SAA can operate at the lowest possible frequency. The analysis of the antenna dimensions demonstrated that lowering the frequency increased the size of the antennas required to meet the field of view requirements. In addition, the FAA regulations limit the choice of frequency to a few discrete bands. The 24 GHz does not provide adequate range for detecting small UAS. Taking all these into consideration, this system was designed at 10 GHz as a good trade-off between propagation effects, antenna size, cost of development and maximum desired range.

Chirp Bandwidth

The chirp bandwidth or RF bandwidth $B_{RF}$ refers to the actual range of frequencies transmitted. While the bandwidth is restricted by FCC regulations, the bandwidth also experiences limitations from a hardware standpoint. Chirp bandwidth, chirp period, and intermediate frequency (IF) bandwidth all combine to determine the visible range of the radar, but chirp bandwidth is the least flexible of the three and can be chosen first.

Reducing chirp bandwidth allows for narrower bandwidth RF components, which can improve the quality and cost of components available, achieving higher powers and lower noise. Many RF components are characterized by their quality factor or Q factor. There is an inverse relationship between the Q factor and the bandwidth over which the device operates. Antennas, amplifiers, mixers, oscillators, and splitters that work over a narrow bandwidth can achieve higher performance in terms of efficiency and noise. For a system to work over a wider bandwidth, the performance metrics tend to decrease and the price tends to increase.

Increasing chirp bandwidth improves range resolution and lowers the radiated power spectral density, which mitigates interference. Range resolution is the separation distance required to resolve two different point scatterers. For pulsed radar systems, range resolution is determined by the time duration of the pulse. For CW radar systems, range resolution is determined by the receiver filter bank frequency separation, which in this case is the FFT bin width formed by the digital signal processing block. The bin width is the ADC sample rate divided by the size of the FFT, $$f_{bin} = \frac{f_{adc}}{N_{FFT}} = \frac{1}{T_c}. \quad (4)$$

Substituting the bin width into the FMCW range equation $$R = \frac{f_b c_0 T_c}{2 B_{RF}} \quad (5)$$

gives $$R_{res} = \frac{c_0}{2\alpha T_c} = \frac{c_0}{2 B_{RF}}. \quad (6)$$

Equation (6) demonstrates that as RF chirp bandwidth is increased, the range resolution becomes finer.

In high altitude applications, range resolution may not be important, but in situations where targets are to be detected in the presence of clutter, range resolution becomes more important. Range resolution was a moderate priority for this sensor, so we elected to use all the available bandwidth at our chosen center frequency. The system has a bandwidth of 500 MHz that extends from 10 GHz to 10.5 GHz, occupying the full band allotted by the FCC for radiolocation, and has a resulting range resolution of approximately 0.3 meters.

Intermediate Frequency Bandwidth

Intermediate frequency (IF) bandwidth $B_{IF}$ is established by the filters, amplifiers, and ADC after the mixer on the receiver. The IF bandwidth can be set independently of the RF bandwidth, although they both affect the maximum range of the radar through the equation $$R\_max=(cB\_1F)/2\alpha. \qquad (7)$$

Once the slope $\alpha$ of the chirp is set, the IF bandwidth determines the maximum range because any target with a longer time delay and beat frequency will be filtered out by the IF low pass filter.

If both high range resolution and long range are needed, then the IF bandwidth is relatively large (10+ MHz). From an analog perspective, this is difficult because active filters require operational amplifiers with approximately 100× the filter bandwidth to function properly. If wideband RF amplifiers are used, they generally have a low frequency cutoff that makes the radar blind to close targets. From a digital perspective, finding an ADC to operate at high sample rates is both difficult and costly. In addition, the digital back end can be configured to be capable of supporting the data rate established by the ADC.

In general, it is often more desirable to have a larger IF bandwidth because it enables both a fast update rate and fine range resolution. However, the analog and digital considerations have the greatest influence on this parameter, and the chirp period is chosen after the IF bandwidth in order to establish appropriate values of maximum range. This system has an ADC sample rate of 2 MHz. It utilizes a set of active analog filters that establish the usable IF Bandwidth at the Nyquist rate of 1 MHz.

Chirp Period

The chirp period $T_c$ is the duration of frequency sweep and is often the last parameter chosen because it is the easiest to modify. The chirp period follows the relationship in Eq. (7), and once both $B_{RF}$ and $B_{IF}$ have been fixed, it shifts the maximum range. Some systems may switch between different values of $T_c$ during normal operation in order to shift the radar field of view between shorter and longer fields with finer and coarser resolution.

The chirp period can also be thought of as the integration time of the radar. If $T_c$ is decreased, then the radar has a faster update rate and is able to detect faster moving targets with less smearing. If $T_c$ is increased, the radar has an increased coherent processing interval, which improves range resolution and gives an SNR advantage for stationary and slow moving targets.

Most FMCW radars in the literature have a chirp period on the order of a few milliseconds. We chose $T_c$ after we had chosen all the other parameters to give us the desired detection range of 1-2 km. For most testing, we used a value of $T_c$=2.048 ms, which establishes a maximum range of about 600m. When different range profiles are needed, we can switch between values of $T_c$=4.096 ms and $T_c$=8.192 ms to detect up to 2400m. In order to improve efficiency, $T_c$ is chosen so that the corresponding number of ADC samples in a frame is equal to a power of two.

Transmitter

The primary goal of the transmitter is to create a clean chirp with high linearity. While a theoretical transmitter architecture looks simple, realizing such a system has many practical challenges. Over the course of this research we implemented several different waveform generation architectures, discovering their advantages and disadvantages for the UAV sense and avoid application. The following section describes the pros and cons of each architecture we implemented.

Direct Digital Synthesizer

A direct digital synthesizer (DDS) is a type of digital-to-analog converter (DAC) that specializes in creating sine waves. It is the digital counterpart to an analog circuit known as a phase locked loop (PLL). Whereas a standalone DAC can create arbitrary waveforms, a DDS combines a DAC with frequency controlled registers and numerically controlled oscillators to create a system that produces sine wave outputs with high precision.

Figure 16:
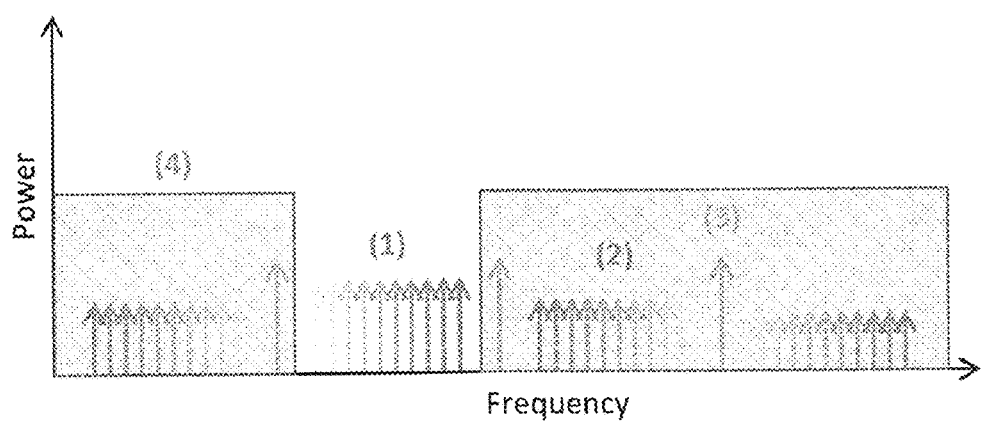
FIG. 16 is a graph showing an example output frequency spectrum of a direct digital synthesizer (DDS).

FIG. 16 shows a typical output frequency spectrum of a DDS. (1) indicates the fundamental, desired waveform, which is a frequency swept sine wave. (2) indicates all harmonics and sub harmonics, which are duplicates of the fundamental chirp at different frequencies, some sweeping in the opposite direction. (3) indicates spurious tone bleedthrough from the reference oscillator. (4) indicates the extremely tight filtering necessary to remove all spurs from a DDS waveform generator.

Within the frequency band of interest, a DDS has outstanding performance. It has better frequency agility and less phase noise than a PLL, which enables it to produce FMCW waveforms with high linearity. Although a DDS can generate the desired waveform extremely well, it generates many additional spurious signals, which are referred to as spurs. A typical DDS output is shown in FIG. 16. Even with an analog reconstruction filter, there are still significant reference spurs and image spurs, harmonics and subharmonics. DDS systems work best when the chirp bandwidth is small, so as to provide sufficient room for filter rolloff. Even with a small bandwidth, the amount of filter stages needed is almost prohibitive, and some amount of spurs are accepted. These issues are exacerbated when an already cluttered spectrum is mixed to higher frequencies. Inherent nonlinearities in mixers and amplifiers amplify the unwanted signals and add additional spurs that are to be filtered using RF filters. Some techniques such as RF coupled line filters and single sideband mixers can aid in the pursuit of a clean waveform, but the amount of additional circuitry and complexity required is substantial. After designing a connectorized version of the DDS-based transmitter, it was determined that a clean version of the architecture could not be made small enough to meet SWaP requirements for UAS.

Tuned Oscillator

Since most of the issues surrounding the generation of the chirp using a DDS involve harmonics, mixers, amplifiers and filtering, a way around those issues is to generate the waveform directly at the frequency of operation. For a system operating at 10 GHz, harmonics and subharmonics at 5 GHz, 15 GHz and 20 GHz can be filtered much more easily than the tightly spaced spurs and image frequencies at 10.5 GHz and 9.5 GHz from the DDS.

One solution for this architecture is a single chip radar transceiver produced by ViaSat that operates a 24 GHz. The ViaSat radar chip operates by locking an oscillator to a base frequency, then fine tuning the oscillator control voltage using a DAC. A chirp is produced by successively incrementing the DAC output code, which increases the oscillator tuning voltage resulting in a frequency chirp at the oscillator output. Because the oscillator operates in an open loop configuration with the DAC, the user can produce arbitrary modulation patterns with high agility. In an unlocked state, however, the system can experience significant drift due to temperature and a high degree of phase noise. Because this system relies on a DAC to tune the oscillator, it is also subject to the non-linear tuning curve of the oscillator. As was discussed previously, the predominant effect of nonlinearity is to effectively decrease the range resolution and range.

Although the tuned oscillator solution does not provide a range sufficient for UAS, it is a practical solution for short range applications. The decreased complexity and high frequency of operation allow for significant miniaturization. After designing a functional 24 GHz single chip radar system, we determined that the chirp non-linearities established range resolution and maximum range that were insufficient for UAV applications.

Phase Locked Loop

Although both of the previous architectures included phase locked loops (PLLs) at some point in the design, the PLL is the core of this architecture. This architecture is one that has only become possible at high frequencies due to very recent developments. A primary component in this architecture, the ADF4159 Fractional-N Frequency Synthesizer by Analog Devices.

This architecture has four main blocks which are connected to form a phase locked loop: the reference oscillator and phase comparator, the loop filter, the voltage controlled oscillator (VCO) and the frequency divider. Similar to the tuned oscillator architecture described previously, the PLL architecture generates the waveform directly at RF, but the PLL architecture remains in a closed-loop locked configuration during operation and is inherently more stable in regards to frequency drift and phase noise.

The operation of a PLL is similar to the way a car adjusts to the speed limit. Initially, the driver notices a difference between the posted speed limit and the reading on the car's speedometer and pushes on the gas to eliminate the difference. As the car accelerates, the speedometer reading increases and the driver applies less gas. The car may exceed the marked speed, in which case the driver applies the brakes until the speed limit is achieved. The driver maintains a constant speed by constantly comparing the car's speedometer to the posted speed limit and making fine-tuned adjustments using the gas and brake pedals.

The gas pedal in a PLL is the tuning voltage of the VCO. The loop compares the divided down output of the VCO to the reference oscillator. If the VCO output frequency is lower than the oscillator, the phase comparator applies a positive voltage to the VCO through the loop filter and the VCO adjusts to match the frequency of the reference crystal. The loop filter determines how quickly the VCO will lock to the reference and how stable it will be once it gets there. A PLL that can quickly hop from one frequency to another will jitter at every frequency it hops to. This jittering is referred to as phase noise. A PLL that slowly transitions, however, will be very stable once it reaches a given frequency. These dynamics are controlled by the bandwidth of the loop filter, and work was done to ensure the right balance between frequency agility and stability. The magic of this system is in the Fractional-N frequency divider. This section allows the user to compare a 10 GHz oscillator output to a 100 MHz reference crystal by dividing by 100. Because the phase comparator locks against the output of the frequency divider to force the equality $$f_{ref} = \frac{f_{VCO}}{N}, \qquad (8)$$

any desired VCO output frequency can be created by changing the division ratio. A division ratio N=100 forces an output frequency of 10 GHz. A division ratio N=99 forces an output frequency of 9.9 GHz. The system generates a frequency sweep by making small, fast adjustments to the division ratio.

Figure 17A:
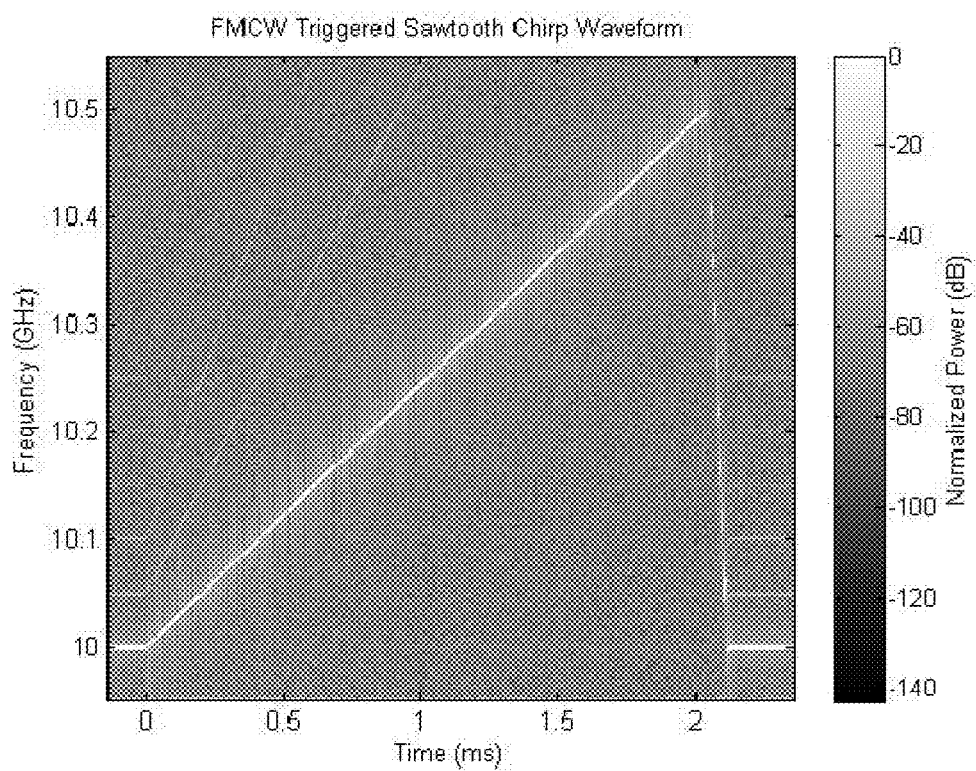
FIG. 17A is a spectrogram of an example chirp waveform.
Figure 17B:
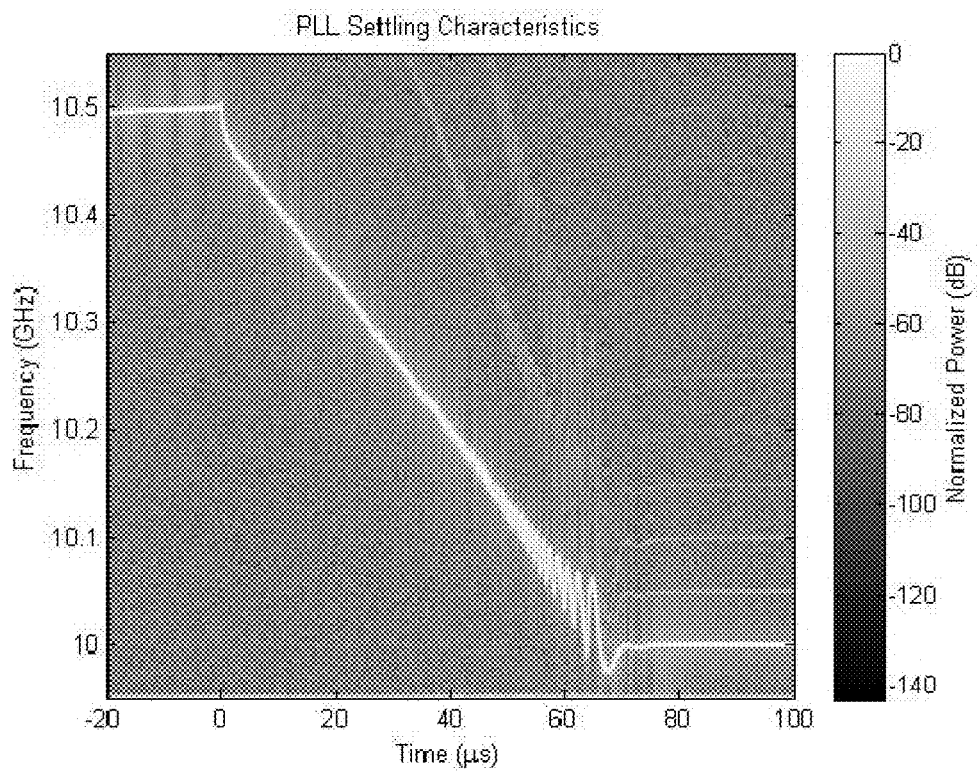
FIG. 17B is a spectrogram showing a magnified last portion of the example waveform of FIG. 17A.

Because the sweep is generated in the frequency domain as opposed to sweeping the tuning voltage, the PLL architecture automatically corrects for the non-linearities in the VCO transfer curve. Although the circuitry is slightly more complex than the tuned oscillator circuitry, it can generate a clean, linear waveform and still provide adequate SWaP specifications. FIG. 17A shows a power spectrogram of the actual chirp being generated on a log color map. Some faint harmonics are visible due to the measurement setup for capturing this waveform, but they are approximately 40 dB below the fundamental. The nonlinearity was found to be below the quantization noise floor introduced by the FFT, which is approximately 100 kHz. Although the main portion of the chirp in FIG. 17A is extremely linear, the chirp does require approximately 80 μs of recovery time before the next chirp. This is shown in FIG. 17B, which is a magnified version of the last portion of FIG. 17A.

The chirp is triggered by the same circuitry that controls the analog-to-digital converter (ADC). Because the chirps are triggered synchronously, the received waveforms can be integrated coherently to improve SNR. After the chirp is complete, the PLL drops to the starting frequency of 10 GHz to wait for the next triggering signal. The settling characteristics of the PLL are shown in greater detail in FIG. 17B. It takes approximately 80 μs for the PLL to settle and be ready for the next chirp. While this delay is small, it does represent lost target dwell time, which could be averaged to increase SNR. While a continuous triangular chirp waveform would solve this issue, it was determined experimentally that asynchronous sampling of a triangular waveform introduces a phase ambiguity of the IF output. For a single channel radar, the phase ambiguity creates incoherence between chirps, lowering the achievable SNR gain from averaging. For phased array radar, phase ambiguities are catastrophic and inhibit the system's ability to extract angle of arrival. After the necessity of phase coherence was discovered, the architecture switched from a continuous triangle chirp to the triggered sawtooth shown, despite the small losses in dwell time.

Figure 18:
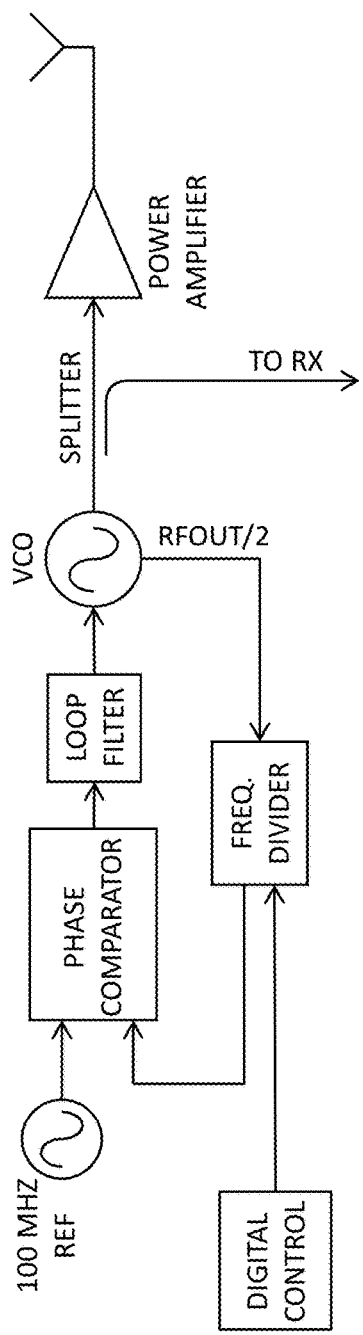
FIG. 18 is a schematic block diagram of a transmitter based on a phase-locked loop waveform generator.

The final transmitter architecture is shown in FIGS. 4 and 18. The system uses a Hittite HMC512LP5 VCO in conjunction with the Analog Devices ADF4159 Fractional-N Frequency Synthesizer chip which controls the frequency divider and the phase comparator. The loop filter was designed in-house and has a loop bandwidth of 125 kHz. The optimal loop bandwidth was determined in simulation using the ADIsimPLL tool available online. Although the rest of the RF subsystem has strong frequency dependencies, the frequency of operation of the transmitter is determined predominantly by the VCO. Because the input bandwidth of the frequency divider chip is from 0.5 GHz to 13 GHz, this transmitter could easily be switched to the 5.8 GHz ISM band or up to 50 GHz using different VCOs with built in frequency dividers.

This design is realized using ground-backed co-planar waveguide (CPWG) on 32 mil (0.813 mm) Rogers 4003C dielectric. To reduce fabrication costs, the same substrate was used for both the RF transceiver and the antennas. While RF design is made easier using thin dielectric, antenna design is better accomplished using thick dielectric, so 32 mil dielectric was chosen to satisfy the needs of both. In RF design, the choice of dielectric affects the size of the traces since the width of a microstrip line scales linearly with substrate thickness and dielectric constant. For this substrate the width of a 50 SI microstrip line is approximately 72 mil, which is wider than some of the ICs used in this system and a major drawback for its implementation. CPWG traces can be made very small depending on the size of the gap between the center conductor and the side ground planes. Since most monolithic microwave integrated circuits (MMICs) have RF input/output transitions that are inherently CPWG, CPWG is a good choice for most RF PCB designs. A drawback of using CPWG is that many passive RF filters are realized in microstrip, so in order to realize a microstrip filters, a high quality transition from CPWG to microstrip is needed.

One important part of the transmitter is the splitter used to couple some of the transmitted energy over to the receiver in the homodyne configuration to act as the local oscillator for the receiver. Some systems use directional couplers or different configurations involving extra circulators in order to minimize excess bleedthrough from the transmitter to the receiver. We implemented the splitter using a Wilkinson power divider with an equal power split. Since the LO needed to be split several times to accommodate each phased array receiver channel, the Wilkinson splitter was able to be reused in the design.

Figure 5:
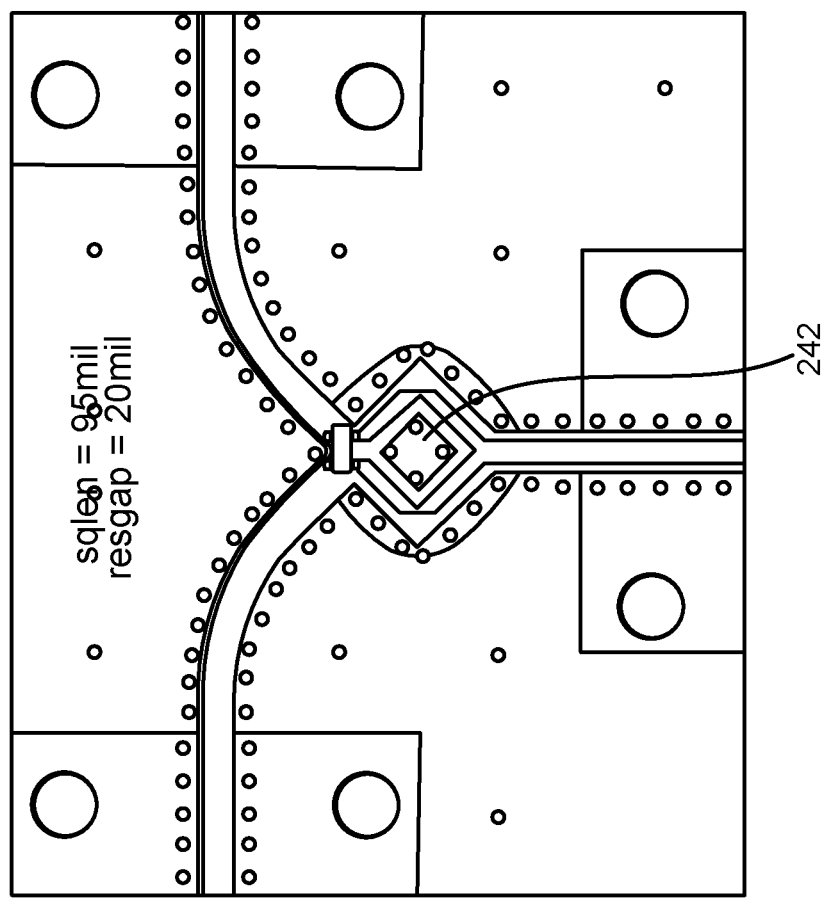
FIG. 5 is an image of a prototype Wilkinson splitter for the RF board of FIG. 4.
Figure 19:
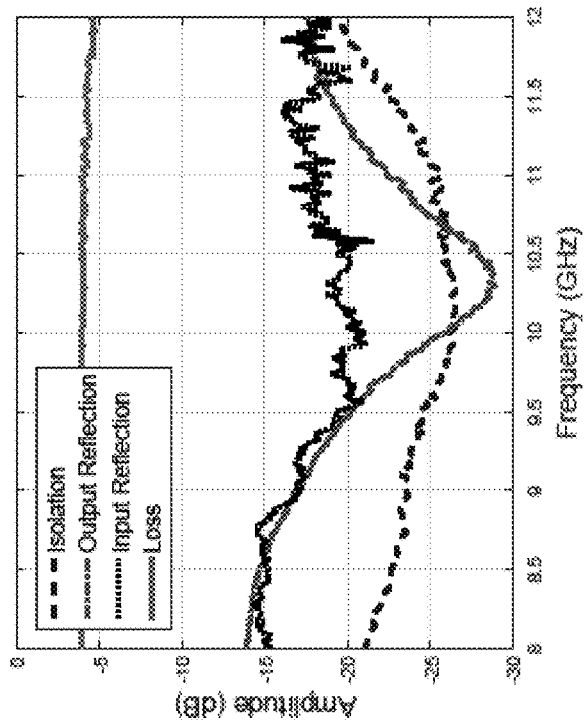
FIG. 19 is a graph showing the S parameters of the splitter design of FIG. 5.

FIG. 5 is an image of the Wilkinson splitter design realized on a PCB using CPWG. This splitter performs within 0.5 dB of an ideal split (including connector losses) and provides 25 dB of isolation at the frequency of interest. FIG. 19 is a graph showing the S parameters of the splitter design of FIG. 5.

This Wilkinson splitter uses the standard topology of matching $\lambda/2$ segments with characteristic impedance $Z_0\sqrt{2}$. Because the dielectric thickness produced microstrip lines whose width was large enough to introduce coupling, the splitter was realized in CPWG. The design was inspired by an integrated circuit design by and was optimized using HFSS. The parameters of optimization were: the side length, which controls center frequency; the trace widths and gaps, which control impedances and matching; and the size of the gap where the 100Ω resistor sits, which contributes to isolation. It was found that using a smaller resistor and less solder improved overall performance and matching. The final design exhibits a total loss of 3.9 dB including the connectors. A separate measurement of a through line using the same connectors exhibits a loss of 0.4 dB, meaning that the designed splitter only deviates from the ideal by 0.5 dB. The splitter has an isolation of 25 dB over the bandwidth of interest, which mitigates some of the effects of phase noise.

The prototype of the system that is shown does not utilize any RF filters on the transmitter. The only spurs generated by this transmitter architecture are at well defined harmonic and subharmonic values of 5 GHz, 15 GHz, and 20 GHz. Because the power amplifier and antennas are only designed for the band of frequencies around 10 GHz, complexity and physical area can be saved by eliminating RF filters from the transmitter with little degradation in performance. If this were a commercial system attempting to pass stringent FCC limitations on out-of-band emissions, additional filtering stages may be necessary to ensure the harmonics do not rise above strict legal limits.

Power Amplifier and Antennas

The output power of the VCO is approximately 5 dBm, which for many of our testing scenarios was sufficient. However, in some cases there was a need for additional output power in order to increase the SNR of small targets. The additional output power was provided by either an on-board power amplifier (PA) or a higher powered external power amplifier.

Figure 8:
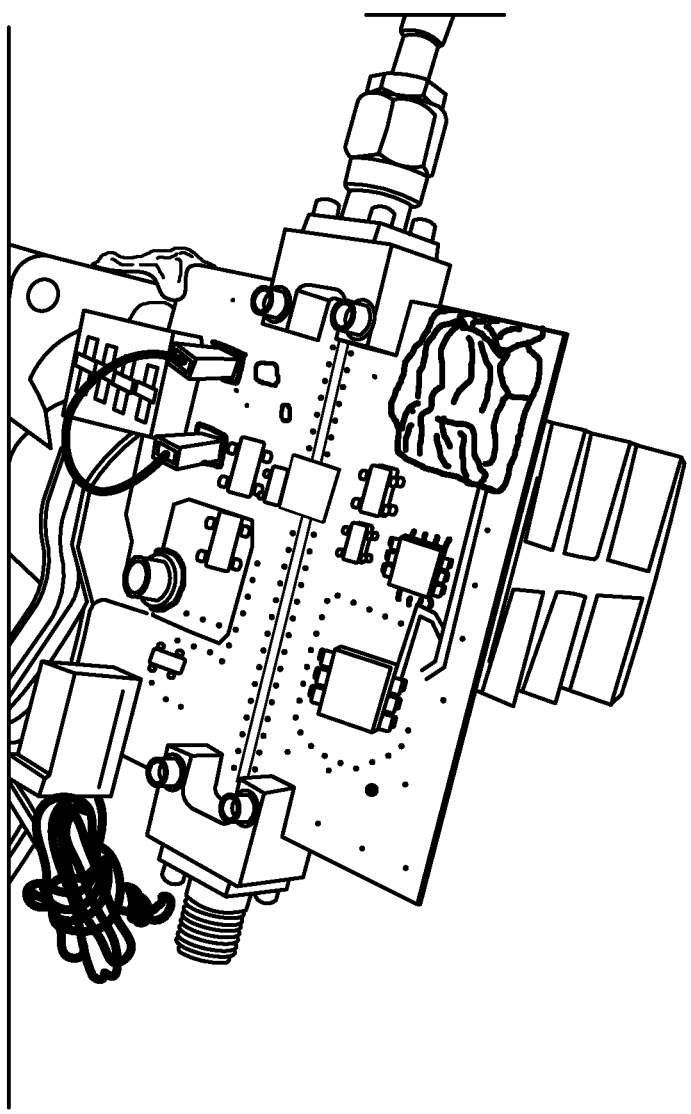
FIG. 8 is an image of an example off-board prototype RF power amplifier.

The on-board power amplifier can be seen in the left side of FIG. 4. After a splitter, the signal is either sent directly to an output SMA connector, or is directed through the on-board PA to a separate output SMA connector. The on-board power amplifier is the HMC451, and can be powered off when not in use. It has a gain of approximately 20 dB, which after the splitter supplies a total output power of 22 dBm (159 mW). The off-board power amplifier shown in FIG. 8 is the HMC952 off-board power amplifier with heat sink and fan to help with thermal dissipation, and a gain of approximately 30 dB. It is used on the unamplified VCO output to produce a total output power of 29.3 dBm (850 mW). It was maintained off the primary radar board for reasons of thermal dissipation.

Figure 20:
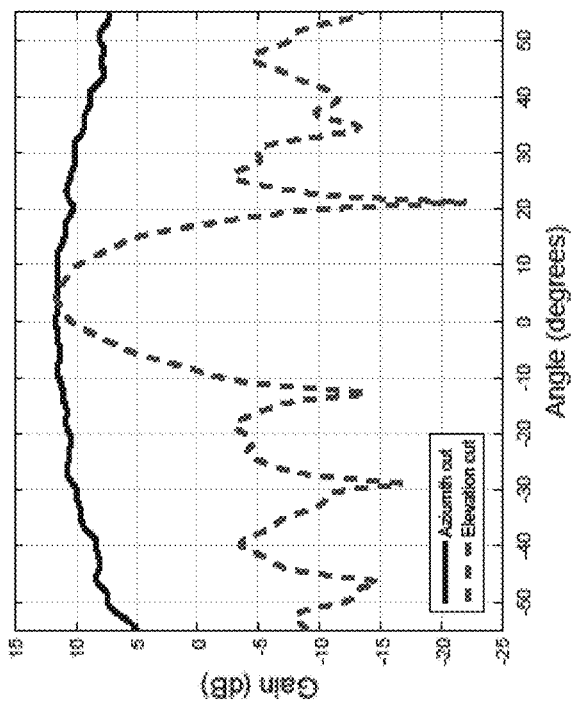
FIG. 20 is a graph showing the radiation pattern at 10.25 GHz for the example antenna of FIGS. 6A and 6B.

We used a set of 4×1 planar endfire Vivaldi antennas designed by BYU student James Eck. The antennas and their radiation pattern at 10.25 GHz are shown in FIGS. 6A and 6B, and FIG. 20. The antennas have a peak gain of approximately 12 dB and a beam width of approximately 30×110. The optimal spacing between the transmit and receive antennas is a minimum of 15 cm, which results in an average of −50 dB of coupling between the transmit and the receive antennas over the frequency band of 10 to 10.5 GHz.

Coupling turned out to be a significant issue in the system, but it only became apparent once high power amplifiers were used in an effort to increase range. One effect of coupling was the phase noise at lower frequencies. Although this raised the noise floor at low frequencies, the power received by close targets was large enough that it did not affect detectability of targets. Another effect of coupling was clipping in the IF waveform. The short path through the cables and between the antennas was seen by the radar as a target with a very low beat frequency on the order of a few kilohertz. The addition of this low frequency beat cosine to the rest of the radar returns introduced periodic clipping in the IF output, which effectively modulated all the signals with a square wave. In the FFT output, the modulation created equally-spaced ghost targets surrounding each true target. The number of ghost targets varied depending on the severity of the clipping, or the amount or power coupled in. The spacing of the ghost targets varied depending on the length of the bleedthrough path, which was a function of the length of the cables and spacing of the antennas. We were able to eliminate the coupling by increasing the spacing of the transmit and receive antennas and by placing absorbing material in between them.

Receiver

The key considerations in receiver design are noise and gain. These figures drive decisions of which amplifiers to use; and other design considerations such as power consumption, size and cost are balanced against how they might contribute to the signal-to-noise ratio (SNR). As soon as the signal has been captured by the antenna the amount of noise in the signal can only be increased. In this case, optimizing for size, weight, power and cost, a reasonable amount of signal integrity is sacrificed in order to achieve a system that will fit on a micro-sized UAS. This section describes the receiver architecture in detail and explains the SNR tradeoffs involved in each decision.

Homodyne Architecture

There are three potential receiver architectures for a continuous wave (CW) radar system: Autodyne, Homodyne, and Heterodyne. Autodyne systems are those where the oscillator and the mixer are the same component and are generally seen in simple doppler radar systems like police radar guns. Homodyne systems are ones where the transmitted signal is used as the local oscillator (LO) signal for downmixing the received waveform. Heterodyne systems are ones that use separate oscillators for upconverting the transmitter and down converting the receiver. The primary difference among these three architectures is in the amount of isolation they provide between the transmitter and the receiver. Isolation is key to ensuring that the phase noise from the transmitter does not contribute significantly more noise than the receiver noise or the sky noise.

This system implements a homodyne architecture with separate antennas for the transmitter and receiver. While the homodyne architecture is favorable in terms of making the system much more compact as well as lowering the requirements of both ADC and processing needs, it does introduce significant local oscillator (LO) bleed-through. Some systems with a single antenna use adaptive cancellation techniques that subtract bleedthrough using a feedback loop. This system uses separate transmit and receive antennas, good antenna matching, and good splitter isolation in order to achieve levels of isolation that do not saturate the RF amplifiers or mixers.

Radio Frequency Subsystem

Figure 9:
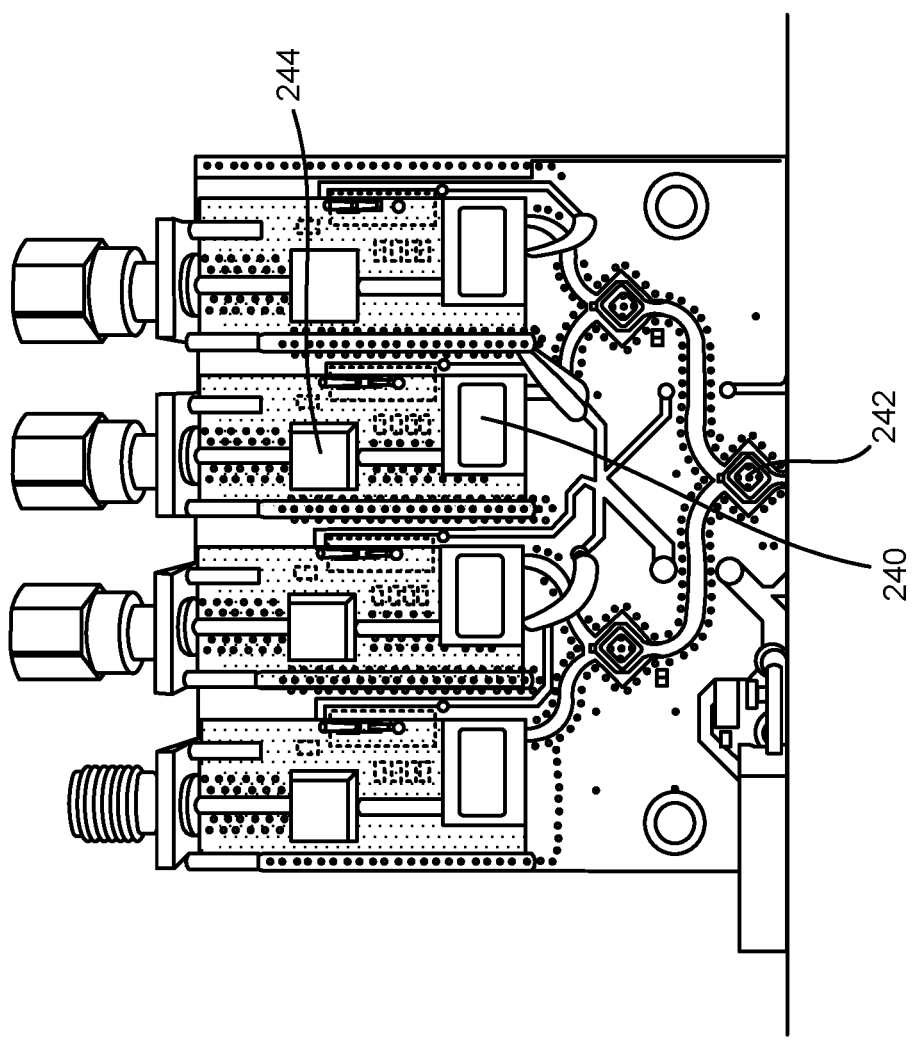
FIG. 9 is an image of a receive portion of the prototype RF board of FIG. 4.
Figure 21:
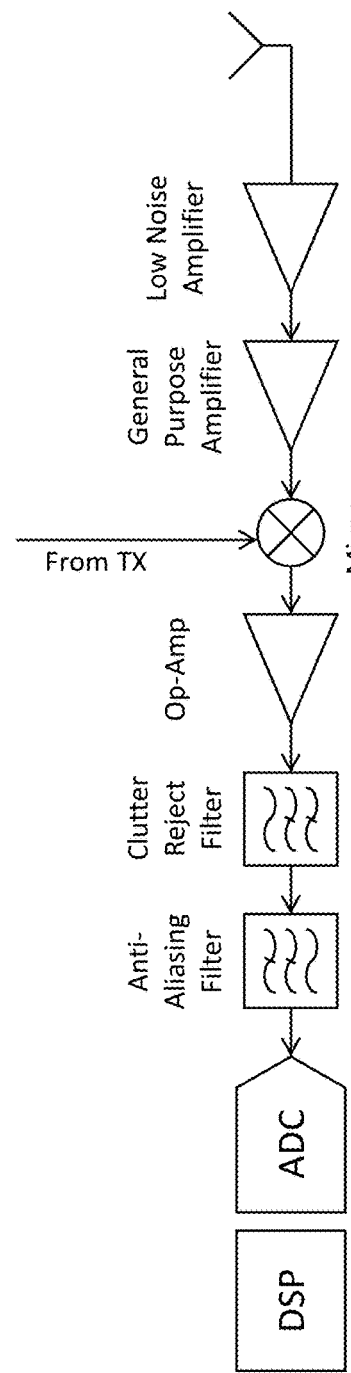
FIG. 21 is a schematic block diagram of an example homodyne receiver.

The receiver is divided into two parts, the radio frequency (RF) subsystem and the intermediate frequency (IF) subsystem. The layout of the RF subsystem and the overall block diagram are shown in FIG. 21. FIG. 9 is an image of a prototype PCB layout of the receiver RF subsystem. The primary focus of the RF subsystem is to establish a reasonable noise figure, minimize coupling between receiver channels, and apply sufficient gain to make up for downconversion losses. An effort was made to make the RF system as small as possible. This serves two purposes. By using fewer components in the RF subsystem, the cost of the system decreases. This also reduces the physical area of each receiver, which helps lower the coupling between receiver channels.

This system uses the Avago AMMP-6222 LNA as the front-end amplifier. Because the first amplifier in a receiver establishes the noise figure for the system, extra care was taken in the layout of the amplifier. Although the amplifier is matched internally to 50Ω, the geometry of the RF input pin only matches that impedance for one specific PCB substrate material and thickness. Three different configurations of various tapering mechanisms were tested to determine the optimal interface in the presence of geometric mismatch. We determined that the transition method that introduced the least mismatch and loss was an abrupt transition that maintained the 5011 CPWG trace geometry all the way to the MMIC footprint, then abruptly changed to the footprint. The same process was used with the other RF amplifiers in order to determine the optimal connection method and the same result was verified. Abrupt transitions result in the lowest mismatch loss because they minimize the electrical length over which the MMIC and the transmission lines are mismatched.

Since this is a homodyne phased array system, that means that the transmitted signal is split equally and sent to each of the receiver channels. This is known as the clock distribution network or LO distribution network. We implemented the LO distribution network by using a series of cascaded Wilkinson splitters. The result, shown in FIG. 21, is only somewhat compact, but has the advantage of being totally lossless and has high isolation among all the channels. In order to have equal LO phase delays among all channels, this solution is ideally suited to situations where the number of receiver channels is a power of two. An alternative solution is the resistive power splitter. A resistive power splitter accomplishes LO distribution in a much more compact manner, operates on a very wide bandwidth, and can be used for an arbitrary amount of channels. However, it does so at the cost of power dissipation. A resistive splitter has double the dB loss of a lossless splitter because of the dissipation through the resisters. Since our application is low-power airborne operation, we use a lossless divider; but for a ground based system with looser power constraints, a resistive power divider could be a better option.

The mixers used are the Mini Circuits MAC-12GL+ double balanced mixers. They require 4 to 7 dBm of LO drive power, so our LO distribution network integrates a preliminary amplifier in order to compensate for splitting losses. The choice of a high quality mixer is important because of the homodyne architecture. If a mixer introduces harmonics, these will appear as ghost targets at two and three times the distance of actual targets. Even if the harmonics are attenuated by 20 or 30 dB, the wide dynamic range of the receiver system may detect the harmonics for close targets. Harmonic distortion is improved by ensuring that the IF output is well matched to 50Ω, but the best way to ensure good performance is to pay the price for a high quality mixer.

Intermediate Frequency Subsystem

At the output of the mixer begins the intermediate frequency (IF) portion of the system. The goal of the IF system is to provide anti-aliasing filtering for the analog-to-digital converters (ADCs) and to amplify the signal to the necessary levels for digitization. This system adds an additional filter to mitigate the effects of antenna coupling.

All the amplification and filtering in the IF is accomplished using low-cost operational amplifiers (op-amps). Op-amps are ideal for amplification because their gain can be easily set and modified using simple resistor ratios. Op-amps are ideal for low frequency filtering because they can eliminate inductors, and use much smaller capacitor values than equivalent passive filters. This allows for more precise filter tuning, and occupies less board space than passive filters, especially at low frequencies.

Figure 11:
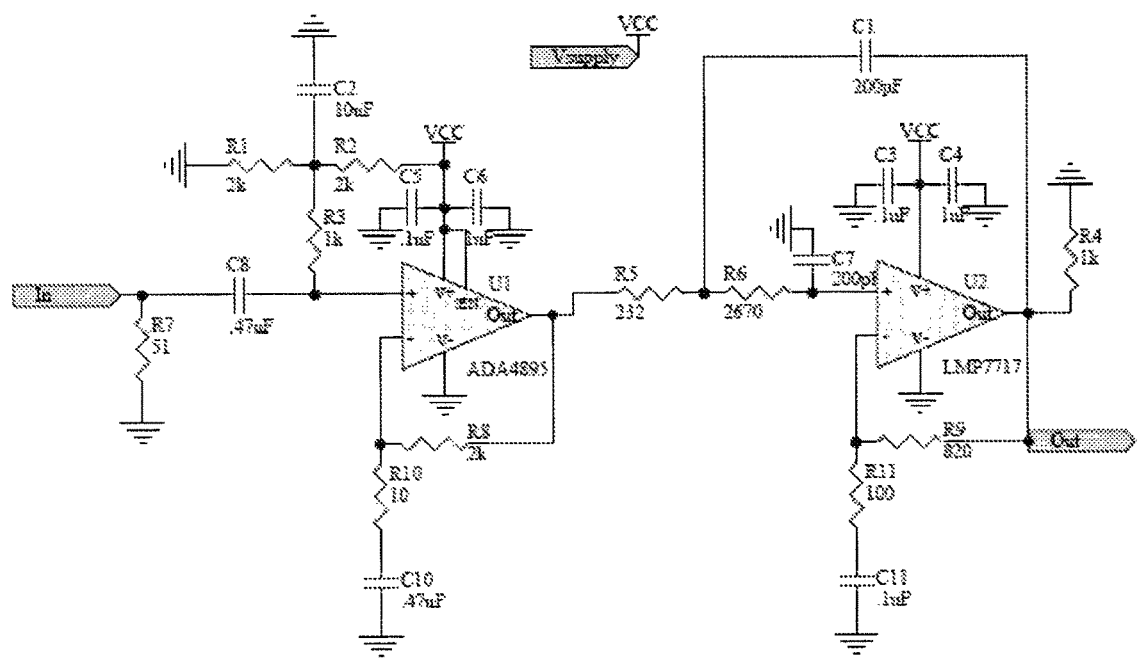
FIG. 11 is a schematic of a low-noise amplifier and a general purpose amplifier for one receive channel of the prototype IF board of FIG. 10.
Figure 22:
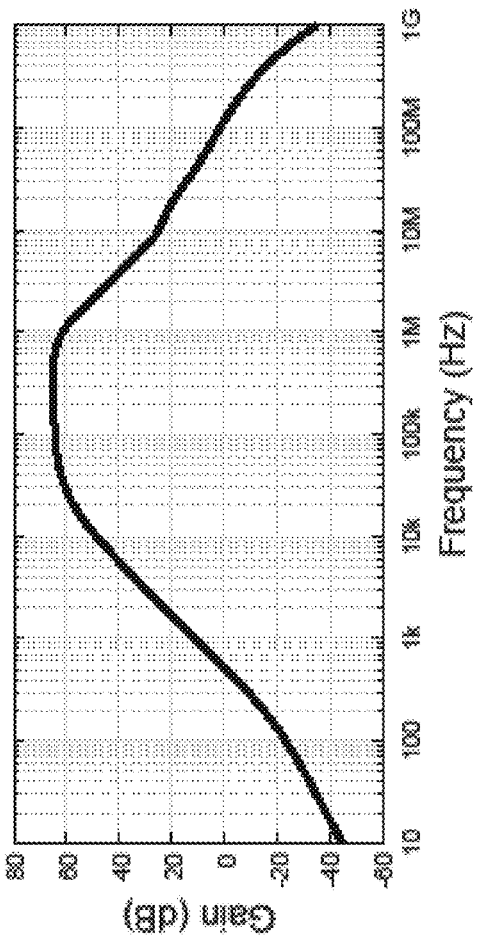
FIG. 22 is a graph of a simulated frequency response of example IF amplification and filtering.

The IF has three stages: the high-pass coupling rejection filter, the amplification, and the low-pass anti-aliasing filter. As is the case with all the RF receiver chains, all the IF receiver chains are identical. The PCB layout for all four is shown in FIG. 10. FIG. 11 is Circuit level schematic of the IF amplification and filtering for a single channel. FIG. 22 is a graph of a simulated frequency response of the IF amplification and filtering for a single channel.

The first amplifier is a high-gain, low noise amplifier using the ADA4895 op-amp. Noise is still an important consideration at this point because the mixer that precedes this stage is a lossy component, as is the impedance matching resistor R7. The amplifier is meant for high-gain applications, and has a gain of approximately 2000 V/V or 66 dB. Because it has such high gain, care can be taken in the layout. One key principle to improve stability of high gain op-amps is to minimize the parasitic capacitance on the inverting pin of the op-amp. We accomplished this by removing a patch from the ground plane underneath the amplifier, and minimizing the physical size of the inverting node. Using these techniques, our amplifiers were stable over the full IF bandwidth.

The coupling rejection filtering was accomplished by implementing a high-pass filter. The received power is inversely proportional to the distance to the fourth power. This equates to a 40 dB/decade increase in received power as a target approaches the radar. By implementing a two-pole high-pass filter with an equal and opposite slope, targets will appear to have the same amplitude as they approach the radar. Since the primary amplitude fluctuation of the receiver is due to changes in range, this high-pass filter eliminates that difference and reduces the necessary ADC dynamic range considerably. The primary issue with coupling and close-up clutter is that since their effective range is so small, they have a huge received power that swamps other targets. By implementing this high-pass filter, the effects of coupling and close clutter returns are mitigated so that they appear to have a similar amplitude as other target returns.

The ideal implementation of the clutter rejection filter would be a filter that rises at precisely 40 dB/decade until it reaches half the sampling frequency of the ADC, where it would encounter a perfect "brick wall" low-pass anti-aliasing filter. In practice, 40 dB/decade rise corresponds with a two-pole high-pass filter. In this system, those poles are controlled by the values of the DC-blocking capacitors C8 and C10 in FIG. 11. Since these are both real valued poles, the corner of the filter is not as sharp as it could be; and it may take about a decade for the filter to transition into the 40 dB/decade slope. In addition, building a system with the ideal clutter rejection response may introduce stability issues because it would have peak gain at a single frequency. As a result, this system uses a filter corner of approximately 50 kHz, which is somewhat lower than the anti-aliasing filter corner and creates a flat response region of the filter.

The anti-aliasing filter is realized using the Sallen-Key filter topology and is a two-pole low-pass Bessel filter with linear phase response in order to improve the time domain response. Since the sample rate is 2 Msamp/sec, the filter cutoff frequency is 1 MHz. It is usually advisable to place the anti-aliasing filter cutoff slightly lower than half the sample frequency, but because the natural falloff of the radar amplitude due to the $1/r^4$ relationship is 40 dB/decade, the filter has an effective falloff of 80 dB/decade and does a good job of reducing the effect of any aliasing.

The two primary sources of signal degradation in the IF were amplifier instability and switching regulator noise. The amplifier instability occurred most in multi-stage amplifier designs where feedback between stages introduced oscillations. Once we transitioned to a design that accomplished all the gain in a single stage, stability improved significantly and resulted in a white noise spectrum. The voltage regulator noise resulted from using on-board switching voltage regulators. These regulators introduced switching noise into both the IF spectrum and the VCO tuning line. Although the IF switching noise can be removed using a digital filter, spurious noise on the VCO tuning line creates additional chirps that create ghost targets. In order to mitigate the noise introduced by switching regulators, we moved them to a separate regulator board off the main board that plugged into the battery or primary DC supply. In ground-based situations where size is not a problem, voltage regulator issues can be avoided completely by using multiple DC power supplies or linear voltage regulators that burn extra power.

Link Budget

The overall receiver performance can be characterized using a link budget analysis. A link budget shows the gain and noise levels at every stage of the design, and can be a helpful way of identifying trouble spots in the design. Using a link budget analysis, the designer can make decisions concerning how much gain is necessary at each stage and thus save money on expensive RF amplification. Table 2 provides the link budget for the system. The system gain $G_{sys}$ is the product of all the previous gains using $$F_{sys} = F_1 + \frac{F_2-1}{G_1} + \frac{F_3-1}{G_1 G_2} + \ldots + \frac{F_n-1}{G_1 G_2 \ldots G_{n-1}}, \quad (8A)$$

and the system noise figure $F_{sys}$ is the combination of the measured gains and noise figures from every previous stage. These calculations are performed using natural numbers, but the numbers listed in Table 2 are given in terms of dB for convenience.

TABLE 2

Calculated link budget for a single receiver channel of the system.

| Component | G (dB) | F (dB) | $G_{sys}$ (dB) | $F_{sys}$ (dB) |
|---|---|---|---|---|
| Low Noise Amplifier (AMMP-6222) | 25.3 | 3.1 | 25.3 | 3.1 |
| General Purpose Amplifier (VMMK-2503) | 10.2 | 5.4 | 35.5 | 3.1 |
| Double Balanced Mixer (MAC-12GL+) | −8 | 8 | 27.5 | 3.3 |
| Operational Amplifier (ADA4895) | 50 | 17 | 77.5 | 3.3 |
| Operational Amplifier (LMP7718) | 15 | 17 | 92.5 | 3.3 |

One tricky aspect in calculating the link budget is the transition between the RF and the IF because of different impedance requirements. The gain and noise figure for all the RF components, including the mixer, are defined using 50Ω termination or matching at all device inputs. This is because maximum power transfer occurs when components are matched. Op-amps are designed for voltage gain and not power gain, so they have a large input impedance and a small output impedance. Their voltage gain is a well defined ratio of the source and feedback resistors. When calculating or measuring the gain of the op-amp in the system, it is necessary to take into account the location of the op-amp in the system. If the op-amp directly follows an RF component, the resistor used to match impedance can be included on the input of the op-amp when measuring its gain. This results in an apparent decrease in expected gain of −6 dB due to the additional voltage drop over the matching resistor. All op-amps that follow the initial impedance transition, however, will have a measured gain that matches the analytic one.

The link budget indicates that the portion of the design that introduces the most additional noise is the low noise amplifier at the beginning of the chain. The receiver performance can be improved by using lower bandwidth amplifiers that are matched specifically to this frequency rather than using packaged, wideband amplifiers. However, since the dominant noise source in the receiver is generally clutter, excess electronics noise is acceptable inasmuch as it does not exceed the levels of the clutter.

Digital Signal Processing

Digital phased array beamforming improves system performance significantly. By sampling all channels, the system can form beams in multiple directions simultaneously or create a two-dimensional image from a previously one-dimensional sensor. This performance, however, comes at a cost. The cost for digital beamforming is the computational cost of a back-end processing framework powerful enough to handle the massive amounts of data produced by a digital beamformer. The back end processing framework is shown in block diagram form in FIG. 26 along with brackets showing where the computation is performed.

Figure 26:
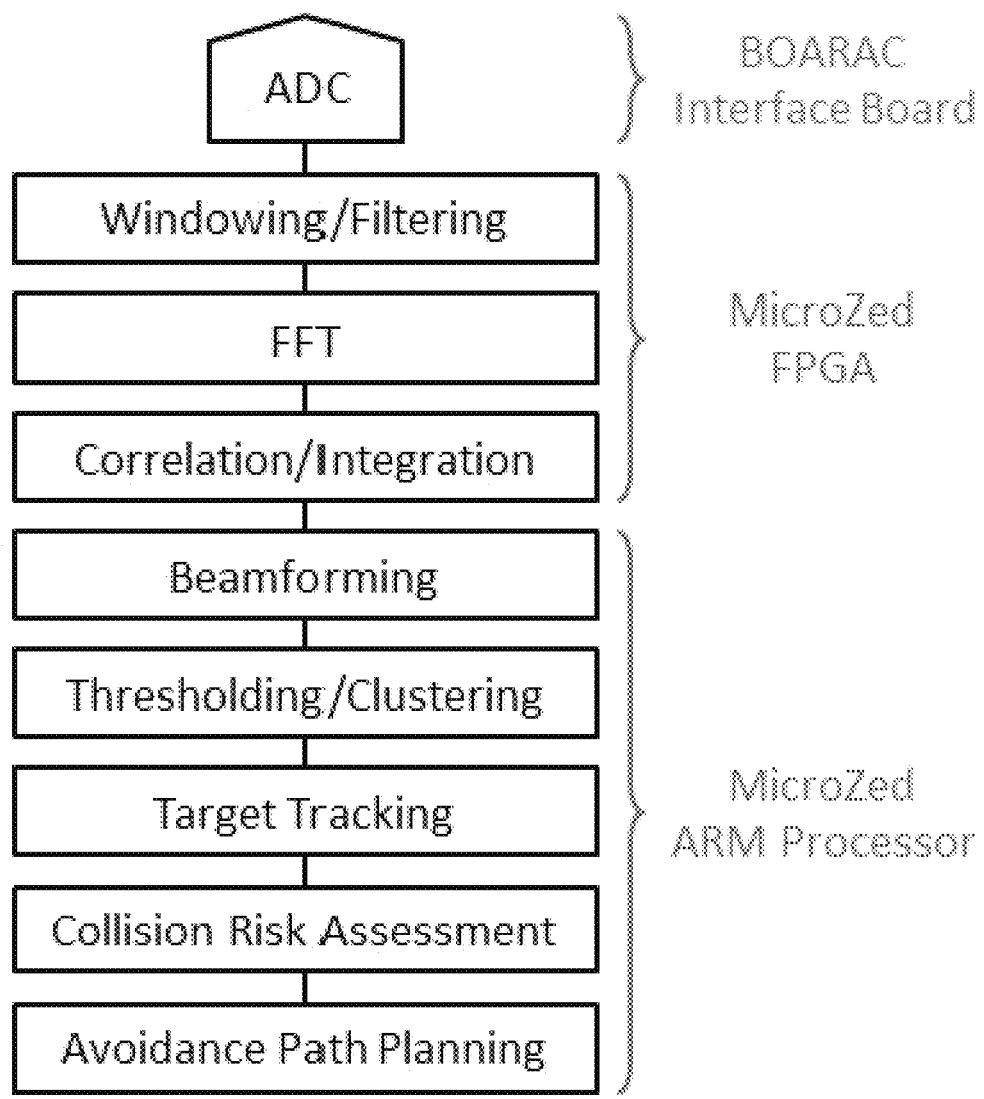
FIG. 26 is a block diagram of the digital processing performed by radar system disclosed herein.

FIG. 26 is a block diagram of the radar digital signal processing. The BOARAC board acts as an interface between the radar transceiver and the DSP. The operations that involve a high data rate are performed on the MicroZed FPGA, and the operations that involve a relatively slow data rate are performed on the ARM processor. The MicroZed board (see FIG. 13)) is a commercially available off-the-shelf development board based on the Xilinx Zynq-7000 FPGA/Processor and performs all back-end processing for this system. The BOARAC board (see FIG. 14) is a custom interface board that includes the ADCs and SPI module routing to interface the radar transceiver with the MicroZed DSP board.

In the initial stages of the research, the raw data was recorded, then processed in post-processing using MATLAB and Python. Using MATLAB, many of these steps were accomplished using just a few lines of code. However, performing these operations in real time on a small platform requires the use of an FPGA or some other mechanism for real-time digital signal processing. We used the MicroZed, a small, low-cost off-the-shelf development board based on the Xilinx Zynq-7000 System-on-Chip that includes an FPGA and ARM processor. As is shown in FIG. 26, the FPGA performs the repetitive, parallelizable processing like the FFT and correlation while the processor handles the more variable tasks of target estimation, tracking, and avoidance planning. This was where the BYU CHREC group made significant contributions to the research. They took our MATLAB code and converted it into efficient FPGA firmware capable of handling the data in real time and implemented Linux on the ARM processor so our processor codes could be written in C. They also developed the BOARAC board, a PCB to interface between the MicroZed and the radar transceiver that has eight channels of ADCs, two digital-to-analog converters (DACs), and all the necessary connections for sending the digital control commands to the radar transmitter using the serial-to-parallel interface (SPI). Although the miniaturization of the radar transceiver is impressive, the BOARAC and MicroZed boards play an equally important role in accomplishing phased-array processing in real time.

Data Acquisition, Windowing and Fourier Transformation

Although this system is a continuous wave radar system, the data acquisition is performed in discrete blocks of time synchronized with each chirp. This is demonstrated in part in FIG. 17A, where the chirp is triggered with a slight delay between chirps to allow time for the PLL to settle. The triggering mechanism for the transmit chirp is synchronized so that the ADC begins collecting samples at the beginning of the chirp and stops collecting samples upon completion of the chirp. This method of data acquisition enforces a relationship $$f\_samp = N\_FFT/T\_c, \quad (9)$$

where $f_{samp}$ is the sample rate of the ADC in Hz, $T_c$ is the chirp period in seconds, and $N_{FFT}$ is the number of samples gathered in a single time block. This nomenclature implies that the FFT size is the same as the number of samples collected. If the number of samples collected in a single period is less than the desired FFT size, the FFT can be performed using samples from multiple consecutive chirps or use zero padding. It is convenient to choose a power of 4 for the value of $N_{FFT}$ because it improves computational efficiency. This system uses a chirp period $T_c$ that results in $N_{FFT}=4096$. The ADC triggering process collects the raw samples into a first-in first-out (FIFO) buffer until all $N_{FFT}$ samples have been collected for each channel so they can be loaded into the FFT block at the same time.

Optionally, before the Fourier transform operation is performed, the time samples can be multiplied by amplitude weights known as a window function. Because the ADC data is a discrete time sequence of a cosine, its discrete Fourier transform (DFT) will be a sinc function. Window functions are useful because they can reduce the sidelobes of the sinc function and reduce scalloping loss. Scalloping loss is the reduction in signal power when the cosine frequency lands between two DFT frequency bins and its power is split between them. A signal's amplitude can vary up to 40% due to scalloping loss. A window function expands the main lobe of the sinc, which spreads the signal across multiple bins and reduces the potential variation, but also the total signal strength and SNR. When the system's range resolution and FFT bin width are coarse, implementing a window function can be very helpful. This system has a fine range resolution, meaning that a single target will physically occupy multiple frequency bins, so scalloping does not occur. In this situation, windowing only results in a reduction of SNR and is not helpful, though in other situations it might improve reliability.

Another potential step before the FFT is a digital filter to reduce clutter. For ground-based radar, clutter is really just a bunch of stationary scatterers the system wants to ignore. Stationary clutter has a coherent structure that allows it to be removed by a pre-whitening filter. A pre-whitening filter is a way of subtracting out a constant background in a way that allows for slight amplitude and phase variations. The filter is implemented by recording some background data and generating an autocorrelation sequence from the time-domain data. Then, using a speech compression tool such as the Levinson algorithm, the autocorrelation sequence is converted to a set of digital filter coefficients that can be implemented to invert the clutter response and remove it from future data. For clutter rejection when the radar is in motion, pre-whitening is more involved, and requires updating the filter coefficients often.

The Fourier Transform used in this system is an $N_{FFT}$-point fast Fourier transform (FFT). After a full frame of samples is loaded into the FIFO buffer and optionally multiplied by a window function or filtered, the data is loaded into an FFT module. The ADCs are 12-bit, and operate at a frequency of $f_{samp}=2.03$ Msamp/sec. This establishes an input data rate of 3 MBps for each channel, or 12 MBps for all four channels. The FFT is performed for each channel independently and performs the 4096-point FFT in 165 μs, leaving plenty of additional time before the next frame of data since the frame interval is 2 ms. Since the ADC data is real valued, the FFT spectrum is conjugate symmetric for positive and negative frequencies, and the negative frequencies can be discarded with no loss of information. The FFT operation produces 24-bit integers, but because most targets are incredibly weak, only the 16 least significant bits are preserved. The output of the FFT block is a set of 2048 ($N_{FFT}/2$) complex valued 16-bit integers that are passed into another buffer to await correlation.

Correlation and Integration

Correlation is a statistical operation that compares the signals from different antennas and helps to separate the signal from the noise. Although phased array beamforming is possible without correlation, correlation is the most mathematically effective way to average out the noise. Correlation is performed for each frequency bin, and initially increases the data rate, multiplying it by a factor equal to the number of antennas. However, since it is coupled with the operation of integration, the data rate can then be decreased to a rate much lower than the original rate.

Figure 23:
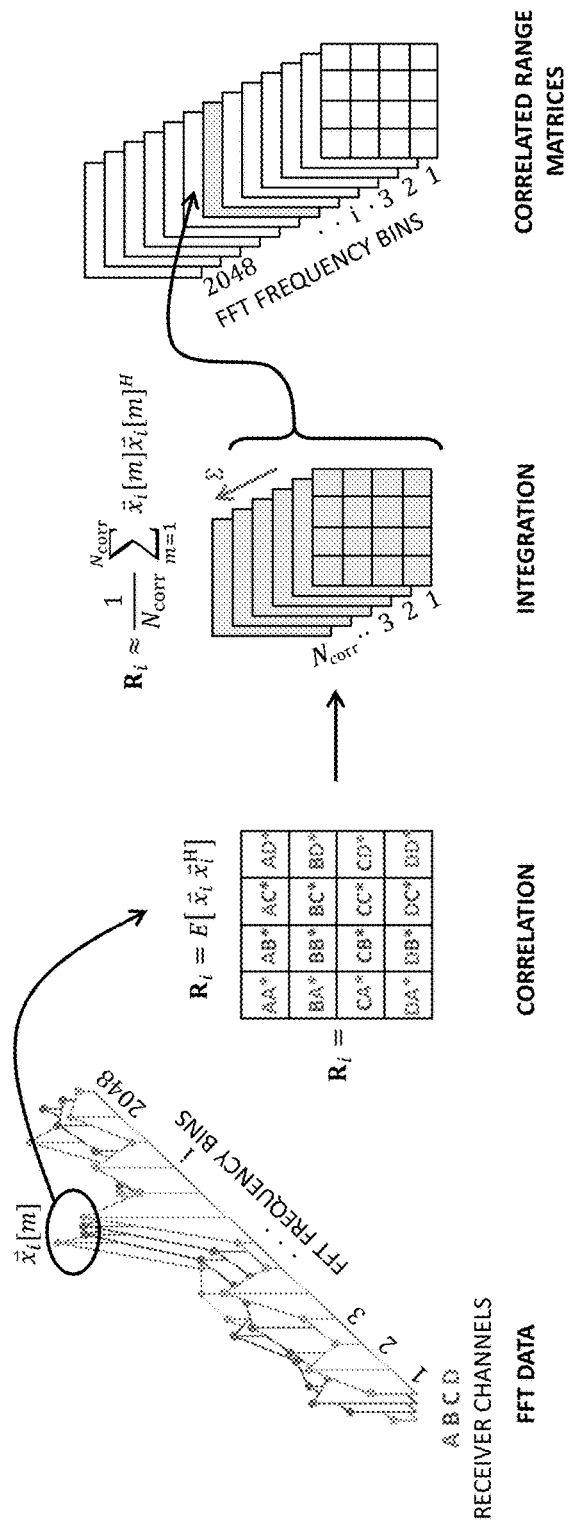
FIG. 23 illustrates example correlation and integration operations.

The correlation process for a single time step is shown in FIG. 23. FIG. 23 illustrates the signal flow of the correlation process after the $m^{th}$ chirp has been recorded. The signals from the $i^{th}$ FFT bins of each channel are gathered into the vector $x_i[m]$. The correlation matrix $R_i$ is formed using the outer product, then integrated over $N_{corr}$ time steps. The result is a collection of integrated correlation matrices, one for each FFT bin.

We use m to denote the time index from one chirp to the next and i for the fft bin index at a given time step. In radar literature, m is often referred to as the slow time index. Using this notation, the received signal from all receiver channels for a single time step and frequency bin is $$x_i[m]=[A_i[m]B_i[m]C_i[m]D_i[m]]^T, \quad (10)$$

where A, B, C and D denote the FFT vectors from each of the antenna channels. The vector $x_i[m]$ can be separated into $$x_i[m]=s_i[m]+\eta_i[m] \quad (11)$$

where $s_i[m]$ is the deterministic signal component and $\eta_n[m]$ is the stochastic noise component.

The signal vector $s_i[m]$ is complex valued and is given by $$s_i[m] = \begin{bmatrix} \sqrt{G_A P_r}\, e^{j\phi_b} e^{j\vec{k}\cdot\vec{r}_A} \\ \sqrt{G_B P_r}\, e^{j\phi_b} e^{j\vec{k}\cdot\vec{r}_B} \\ \sqrt{G_C P_r}\, e^{j\phi_b} e^{j\vec{k}\cdot\vec{r}_C} \\ \sqrt{G_D P_r}\, e^{j\phi_b} e^{j\vec{k}\cdot\vec{r}_D} \end{bmatrix}, \quad (12)$$

where $P_r$ is the received signal power at that range, $\phi_b$ is the bulk phase shift derived in $$x(t) = \sqrt{G_s P_r}\, \cos\left(2\pi\frac{f_b}{\alpha\tau}t + \frac{\phi_b}{2\pi f_0 \tau + \pi\alpha\tau^2}\right) + n_3(t), \quad (12A)$$

for $\tau \le t \le T_c$.

the term $e^{j\vec{k}\cdot\vec{r}_A}$ is the additional phase shift to each antenna, and $\vec{r}_A, \vec{r}_B, \vec{r}_C, \vec{r}_D$ are the locations of each of the antennas with respect to the array origin. Because correlation involves conjugate multiplication, the bulk phase shift is removed from the signal leaving only the phase variation due to angle. This means that even if the bulk phase shift changes from pulse to pulse, it will have no effect on the coherence of the integration.

The noise component $\eta_i[m]$ is random in both space and time. The noise is uncorrelated in time because the thermal input noise has a white power spectral density. The relationship between the noise at different antenna locations in space is written as the covariance matrix $$R_{\eta,i} = \begin{bmatrix} \sigma_A^2 & \sigma_{AB} & \sigma_{AC} & \sigma_{AD} \\ \sigma_{BA} & \sigma_B^2 & \sigma_{BC} & \sigma_{BD} \\ \sigma_{CA} & \sigma_{CB} & \sigma_C^2 & \sigma_{CD} \\ \sigma_{DA} & \sigma_{DB} & \sigma_{DC} & \sigma_D^2 \end{bmatrix}. \quad (13)$$

The diagonal variance terms for each channel are the noise powers previously defined as $$\sigma^2 = k_B T \frac{f_{samp}}{N_{FFT}} FG, \quad (14)$$

where F and G are the noise figure and gain for that particular channel. The off-diagonal terms are the covariances between each pair of antennas. Spatial noise correlation at antenna inputs arises from mutual coupling, where the presence of one antenna affects the receiver characteristics of another or from noise sources coming from a particular direction. Often the assumption is made that the noise is spatially white, meaning that the noise comes from all directions and the off-diagonal terms are zero. When this is not the case, an estimate of the noise covariance matrix is measured when no signal is present and used to calibrate out antenna coupling from future measurements.

If we assume that the signal is zero mean, then the correlation matrix is the time expectation of the received signal vector $$R_i = E[x_i x_i^H]. \quad (15)$$

The expectation is approximated by integrating the correlation matrix over several time steps to produce the maximum likelihood estimate $$R_i \simeq \frac{1}{N_{corr}} \sum_{m=1}^{N_{corr}} x_i[m] x_i[m]^H, \quad (51)$$

as is shown in FIG. 23. A good value for the number of chirps to correlate, $N_{corr}$, is determined by the amount of time a target is expected to stay within an FFT bin. This is calculated using range resolution 41, the expected radial velocity, and the chirp period as $$N_{corr} = \frac{R_{res}}{vT_c}. \quad (17)$$

Using a value for v of 50 m/s (33.5 mph) and the radar parameters listed in Table 1, $N_{corr}$ is calculated to be approximately 3 pulses. If the range resolution is coarser and the pulses are shorter, $N_{corr}$ can be much larger.

Correlation on the FPGA is implemented in a slightly modified way to improve computational efficiency. The correlation matrix $R_i$ is Hermetian symmetric, meaning that the off-diagonal entries in the upper right half are equal to the complex conjugates of the off-diagonal entries in the lower right half. The system exploits this by only computing and storing the diagonal entries and the upper right half and stores them in a row vector rather than in matrix form. This reduces the number of entries from 16 to 10 for a four-channel system.

Integration is interleaved with correlation to reduce the total number of operations and memory required. Rather than storing the correlation data from every pulse and integrating it after all $N_{corr}$ pulses have been acquired, the integration is done using an accumulator. The accumulator maintains a rolling sum of the pulse correlations and keeps track of the sum index. Once the sum is complete, the accumulator divides the result by $N_{corr}$. In order to perform this process more efficiently, our system rounds $N_{corr}$ to the nearest power of two so the division step can be accomplished using a bitshift operation.

The operations of correlation and integration are done in parallel for every frequency bin simultaneously. The FPGA handles both of these operations very efficiently, accomplishing correlation in just 6 clock cycles for correlation and 3 clock cycles for integration. This introduces a total latency of just 45 ns for the operations of correlation and integration. Although correlation introduces a slight increase in data rate, the integration reduces it significantly. For a value of $N_{corr}$=16, the data rate on the output of the correlator and integrator block is reduced from 12 MBps to 1.9 MBps as the data output interval slows from 2 ms to 32 ms.

Beamforming

Beamforming extracts direction of arrival information from the correlation matrices. This system uses beamforming to form a range/angle image of the radar field of view and applies image processing techniques in the estimation of target locations. The image is comprised of a set of equally spaced beams in angle for every range bin. This method creates rich radar visualizations, and is helpful in debugging but is not the only method of phased array beamforming. This section details the method used in this system and mentions a few alternatives.

The formulation of the weight vector begins with the normalized signal steering vector $$d = [e^{j\bar{k}\cdot\bar{r}_A} e^{j\bar{k}\cdot\bar{r}_B} e^{j\bar{k}\cdot\bar{r}_C} e^{j\bar{k}\cdot\bar{r}_D}]^T. \quad (18)$$

The vector d is a normalized version of the signal vector $s_i[m]$ in Eq. (12), but includes only the phase components that correspond to the phase delays between each antenna position. d is formed using the relative antenna locations $\bar{r}_A$, $\bar{r}_B$, $\bar{r}_C$, $\bar{r}_D$, and the incident wave vector $\bar{k}$. Although $\bar{k}$ in $s_i[m]$ is the actual incident wave vector, d can be formed for any desired incident angle. For a one-dimensional linear array with N elements spaced at distances of d, the signal steering vector is written as $$d = e^{jkd\cos(\theta)[0,1,\ldots,N-1]}, \quad (19)$$

where θ is the angle between the incident wave and the vector normal to the array direction.

The SNR at the output of the beamformer is written as $$SNR = \frac{w^H R_s w}{w^H R_n w}, \quad (20)$$

where $R_s$ is the correlation matrix of the signal vector $s_i$ and $R_n$ is the correlation matrix of the noise vector $\eta_i$. If we want to maximize the SNR at the beamformer output, the optimal weight vectors are found by determining the solution to the generalized eigenvalue problem $$R_s w = \lambda R_n w. \quad (21)$$

One potential option for a phased array system is to stop at this point and use it as the basis for the beamformer. Rather than form a range/angle image, the system could solve this eigenvalue problem by estimating $R_s$ and $R_n$ at every range. If the solution to Eq. (21) produces a single dominant eigenvalue, then the corresponding eigenvector is used as the weight vector to estimate the signal strength. The angle of arrival is estimated by finding the signal steering vector d that most closely approximates the eigenvector. If there are multiple dominant eigenvalues corresponding to multiple targets at that range, then the same thing can be done for their corresponding eigenvectors.

The solution to Eq. (21) is simplified if we make the assumption that $R_s$ is a rank one matrix of the form $\sigma_s^2 dd^H$. This means we assume that there is only one target per range bin. If the range resolution is small and there is little clutter in the environment, this is a valid assumption, even in the presence of multiple intruders. Under this assumption, the weight vector solution simplifies to $$w = R_n^{-1} d. \quad (22)$$

If the noise at the array outputs is thermally isotropic and there is no mutual coupling between elements, then $R_n$ is the identity matrix and w=d. If this is not the case, then $R_n$ can be estimated by pointing the radar system at the sky and recording the noise correlation matrices for every range bin.

In this system, the weight vectors were formed by determining a desired number of beams, $N_{beams}$, then creating a vector of incident angles linearly spaced between −90 and 90. These angles are substituted into Eq. (19) and Eq. (22) to create a matrix W of $N_{beams}$ different weight vectors. For a two-dimensional phased array, the weight vectors are formed by choosing $\bar{k}$ vectors equally spaced over a hemisphere, which are substituted into the more general Eq. (18). These weight vectors are determined once during calibration, then used for the duration of testing. If the system has strong interference from a known source that it wishes to remove via calibration rather than processing, it can use the method of subspace projection to modify the weight vectors. This is given by $$w_{SP} = \left(I - \frac{1}{4} d_i d_i^H\right) w, \quad (23)$$

where $d_i$ is the signal steering vector for the interferer. In radio astronomy, the interferer might be a satellite or cell phone tower. In radar, the interferer might be a source of clutter (building, vehicle) that is overwhelming the signal.

Figure 24:
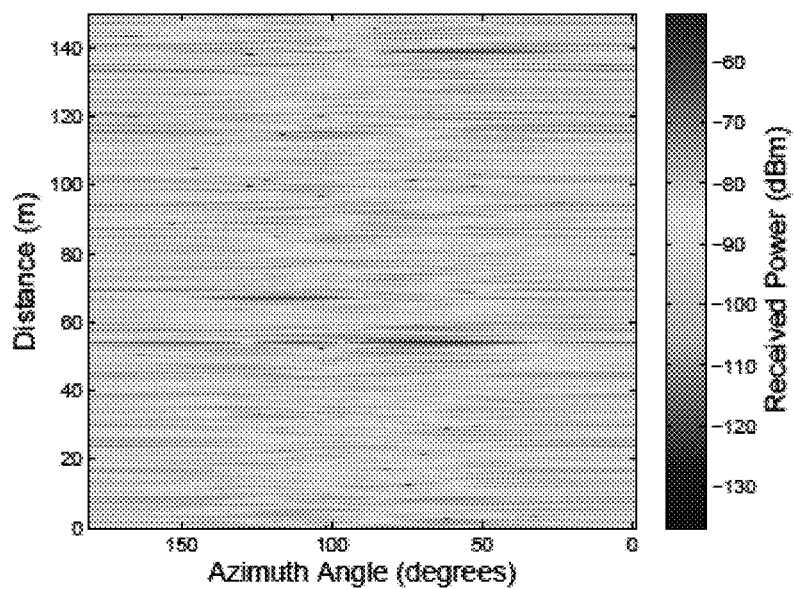
FIG. 24 is a graph illustrating example outputs of the radar systems disclosed herein.

FIG. 24 is a graph illustrating he simulated output of a four-channel phased array radar system with three targets.

A range/angle image is created by forming a set of beams for every range bin. We will call the image matrix S(i, a) where i is the range/frequency index that ranges over i=1, 2, . . . , $N_{FFT}/2$ and a is the angle index that ranges over a=1, 2, . . . , $N_{beams}$. If we let $w_a$ refer to the weight vector w at angle index a, then the pixel intensity (power) using the $i^{th}$ correlation matrix is $$S(i,a) = w_a^H R_i w_a. \quad (24)$$

The full image S(i, a) is $N_{FFT}/2$ by $N_{beams}$ pixels. If the number of elements in the array is smaller than the number of beams formed there will be smearing between column elements in a given row because the beams will overlap. This smearing is shown in FIG. 24. If the image is transformed to XY coordinates, then the smearing occurs radially in a banana shape. The final image may be complex valued, but at this point, only the magnitude is important.

An ideal system would have identical paths from the antenna output to the ADC input for all receiver channels. In reality, there are gain and phase variations in addition to coupling between channels, which may affect phased array performance. These effects can be accounted for and calibrated out using the transfer matrix Q. When the system is stable, Q can be measured once, then used for the life of the system. Q is measured experimentally by placing a scatterer at a known distance with the array boresight angled directly at the scatterer. Each row in Q is the signal vector $x_i$ when all antenna inputs are capped except for the antenna corresponding to that row. Once all the measurements have been obtained, we can normalize the matrix to the first element since we are only concerned about relative variations between antennas. Since gain and coupling may vary as a function of frequency, in order to fully calibrate the system a Q matrix can be measured for every single frequency bin. In practice, this process is simplified by measuring Q at a few distances, and then averaging them. Q can be simplified further to account for just the path delays by removing all off-diagonal elements and normalizing the diagonal elements to unit magnitude. The calibration is applied by modifying the analytically computed beamformer weights w to create the effective open circuit beamformer weights $$w_{oc} = Q^H w. \quad (25)$$

Although beamforming is well suited to FPGA implementation, our system implemented it on the MicroZed processor due to lack of available reconfigurable hardware. Upgraded versions of the MicroZed have more available FPGA space, which would allow this block to be shifted off the processor. In the debugging and development phases of the project, the entire range/angle image was formed at every time step in post processing to create a video effect. In the real time version of the system, beamforming is performed only on the FFT bins that exceed a preliminary threshold in order to save computing resources.

Thresholding and Clustering

Thresholding is the point where decisions are made on what is actually signal and what is actually noise. Because the principal noise variation occurs on the range data, thresholding is done on a single range-indexed vector that combines the inputs from all antennas which we will call q, which has a total of $N_{FFT}/2$. In order to extract the maximum possible SNR, thresholding can be done after beamforming. In this case, the values in q are the maximum values in each row $$q_i = \max(S(i,:)). \quad (26)$$

If thresholding is done before beamforming, then the system suffers an SNR penalty of approximately the square root of the number of elements in the array. In this method, possible values of $q_i$ are the trace of the correlation matrix $R_i$ or some matrix norm such as the Frobenius norm.

Figure 25:
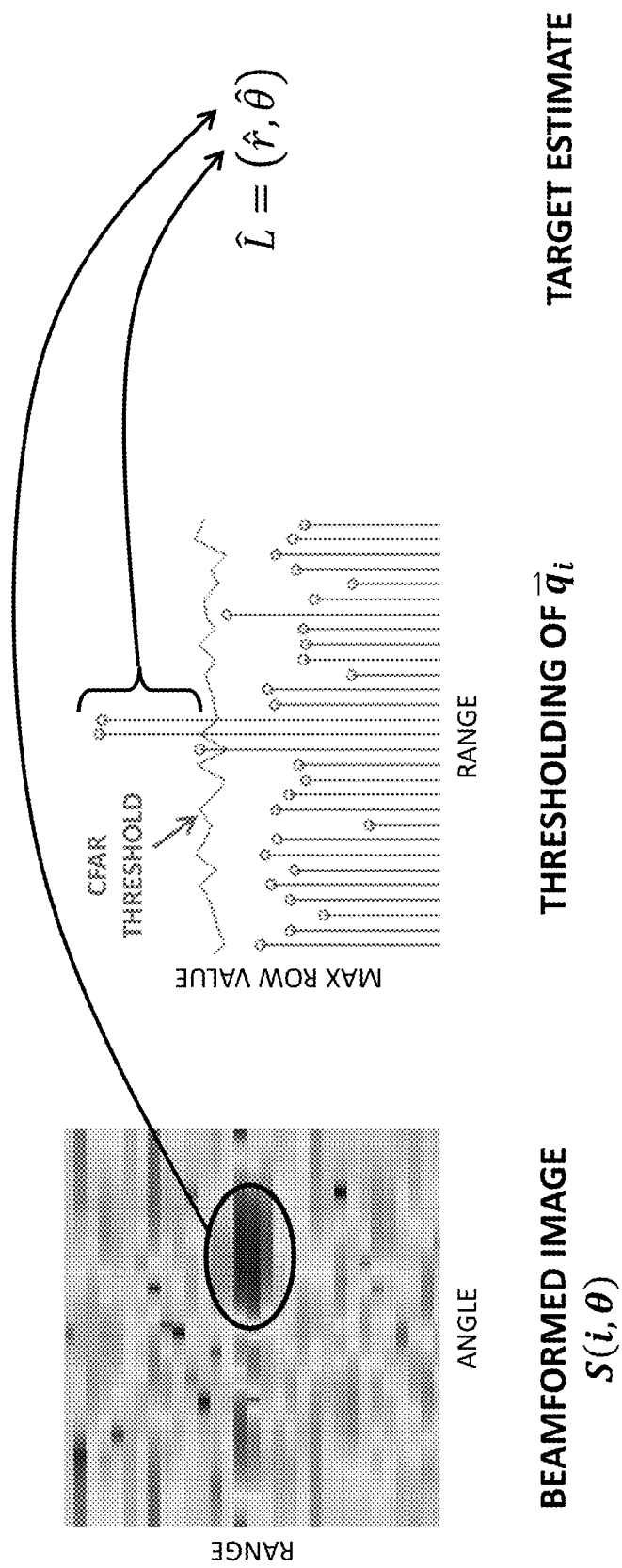
FIG. 25 illustrates example thresholding operations.

The threshold established is a constant false alarm rate (CFAR) threshold. The CFAR threshold works by estimating the probability density function (PDF) of the noise, and then setting a threshold k that will yield the desired probability of false alarm ($P_{FA}$) according to the equation $$P_{FA} = \int_k^\infty f_{noise}(z) dz, \quad (27)$$

where $f_{noise}(z)$ is the PDF of the noise. If the noise is assumed Gaussian, then the noise in the range/angle image will be Rayleigh (power) and the integral is easy to solve for the appropriate threshold given an estimated variance. This variance is estimated by storing q for every time step. However, the noise sources may be more complex, and a more efficient method is the cell averaging technique. Because the receiver includes many non-ideal filters, a different CFAR threshold is calculated for every range bin as is shown in FIG. 25. This way, the user sets a value for $P_{FA}$ and the system automatically determines thresholds for every range bin that account for gain and noise figure variations across frequency.

FIG. 25 illustrates a thresholding process that takes the maximum value from each row of the beamformed image. These values are collected over multiple time steps to estimate the noise properties from which a CFAR threshold is calculated. The clusters which rise above the threshold are combined into a single target location estimate for each cluster.

Because the actual targets are not point scatterers, and because their beat frequency will not fall perfectly in an FFT bin, a single target will occupy multiple frequency bins. After thresholding, this will result in clumps of targets. The location estimate $\hat{L} = (\hat{r}, \hat{\theta})$ of the target is found by taking the weighted average of the range and angle clustering, which simplifies to $$\hat{r} = \frac{c_2}{\sum Nq_i} \sum Nq_i i \quad (28)$$

$$\hat{\theta} = \frac{c_3}{\sum Nq_i} \sum Nq_i a_{S(i,\max(\theta))}, \quad (29)$$

where the summation over N denotes summing over all indices within a given cluster. The index $a_{S(i,\max(\theta))}$ corresponds to the angle index of the maximum value in the $i^{th}$ row of the image $S(i,\theta)$. Because the weighted averages yield an index estimate of the true target location (which may be fractional), the constants $$c_2 = \frac{f_{samp} c}{N_{FFT} 2\alpha} \quad (30)$$

$$c_3 = \frac{180}{N_{beams}} \quad (31)$$

convert the index estimates to numerical estimates of range and angle respectively.

After the targets have been thresholded, clustered, and centroided, the data rate is reduced significantly. Rather than large matrices that occupy megabytes of space, the data consists of a collection of ordered pairs that apply very little computational stress. Although the current system implements beamforming, thresholding, and target estimation on the MicroZed processor, future iterations will shift this load to the FPGA so that there is no burden of raw radar data on the processor and it can be dedicated to the avoidance and navigation algorithms.

Target Tracking, Risk Assessment, and Collision Avoidance

The operations of target tracking, collision risk assessment and avoidance path planning fall within the domain of control theory.

The target tracking in this system was accomplished using the Recursive Random Sample Consensus Algorithm (R-RANSAC) developed by Peter C. Niedfeldt (Niedfeldt, Peter C. "Recursive-RANSAC: A Novel Algorithm for Tracking Multiple Targets in Clutter" (2014). BYU Scholars Archive. Paper 4195. Available at http://scholarsarchive.byu.edu/etd), the entirety of which is incorporated herein by reference, as a way to track multiple targets in the presence of clutter. The R-RANSAC algorithm works by creating a number of models that fit new data with groupings from past data over a specified time window. At each time step, the models are passed through a Kallman filter to predict the future state. If the new data fits the prediction of any models, those models are updated to include the new data. If the new data does not fit any of the models, a new model is formed by randomly selecting several past points and performing a linear extrapolation between the new data point and each of the randomly selected points. The quality of each potential model is determined by the inlier ratio: the number of past points that fit the model within a certain threshold. The randomly generated model is added to the set of existing models. The set is ordered according to the inlier ratio of each model, and the model with the lowest inlier ratio is removed from the set. Models that have been alive past a certain threshold and have the required inlier ratio are passed to the output as valid target tracks. The R-RANSAC algorithm performs well in systems with a low probability of detection by maintaining a long active window so that many measurements can be missed without discarding a good model.

After radar return is deemed to be a valid target, the system determines if the intruder actually imposes a collision risk. This assessment is made using the planned trajectory of the primary aircraft and the estimated trajectory of the intruder. In one method, the intruder's future location is estimated by using linear extrapolation and the closest point of approach is calculated. If the closest point of approach falls within a certain safety threshold, the scenario is flagged as a collision course, and avoidance maneuvering is initiated. Another method uses a probabilistic model of the intruder location, rather than a linear extrapolation. The probabilistic model creates a sort of spatial PDF of where the intruder might fly in the future based on the uncorrelated encounter model developed by MIT Lincoln Laboratory and the flight dynamics of the aircraft in question. An assessment of the probability of collision is determined by how much the primary aircraft overlaps the intruder PDF at the closest point of approach. The probability of collision is continuously evaluated, and if it exceeds a threshold, then an avoidance maneuver is executed. Although the probabilistic method requires more computation than the linear extrapolation method, it offers an improvement in the overall probability of correctly detecting a collision.

The avoidance path planning is accomplished by using a graph search algorithm. The algorithm divides the space into a three-dimensional grid of locations where it can travel. At each time step, a cost function is assigned to each of the closest nodes. The cost function includes the cost of traveling the distance to that node, the cost of deviating from the original course, the cost of assuming a trajectory that will increase collision risk, and the cost of being close to the intruder. The system chooses the node that minimizes cost at every time step. If the node discretization is coarse, then the planned avoidance path may be somewhat clunky, and it can be passed through additional processing to create a smooth flight path.

One or more of the elements and interfaces disclosed herein may be duplicated, implemented in the parallel, implemented in the singular, combined, divided, re-arranged, omitted, eliminated and/or implemented in any other way. Further, any of the disclosed elements and interfaces may be implemented by a processor, a computer and/or a machine having a processor, such as the Microzed board by ZedBoard. Example processors include, but are not limited to a circuit, a programmable processor, fuses, an application-specific integrated circuit (ASIC), a programmable logic device (PLD), a field-programmable logic device (FPLD), an FPGA, a digital signal processor (DSP), a graphics processing unit (GPU), a central processing unit (CPU), a microcontroller, a controller, etc. Any of the elements and interfaces disclosed herein may, for example, be implemented as instruction, program code, machine-readable instructions, etc. carried out by one or more of a processor, a computer and/or a machine having a processor. A processor, a computer and/or a machine having a processor may be used, configured and/or programmed to execute and/or carry out the examples disclosed herein. For example, any of the examples may be embodied in instructions, program code, machine-readable instructions, etc. stored on a tangible and/or non-transitory computer-readable medium accessible by a processor, a computer and/or other machine having a processor, such as the Microzed board by ZedBoard. Machine-readable instructions include, for example, instructions that cause a processor, a computer and/or a machine having a processor to perform one or more particular processes or methods.

The example methods disclosed herein may, for example, be implemented as instructions, program code, machine-readable instructions carried out by a processor, a computer and/or other machine having a processor. A processor, a controller and/or any other suitable processing device such as those on the Microzed board by ZedBoard may be used, configured and/or programmed to execute and/or carry out the example methods. For example, they may be embodied in instructions, program code and/or machine-readable instructions stored on a tangible and/or non-transitory computer-readable medium accessible by a processor, a computer and/or other machine having a processor, such as those on the Microzed board by ZedBoard. Many other methods of implementing the example methods may be employed. For example, the order of execution may be changed, and/or one or more of the blocks and/or interactions described may be changed, eliminated, sub-divided, or combined. Additionally, any or the entire example methods may be carried out sequentially and/or carried out in parallel by, for example, separate processing threads, processors, devices, discrete logic, circuits, etc.

As used herein, the terms "computer-readable medium" and "machine-readable medium" expressly exclude propagating signals. Example computer-readable or machine-readable medium include, but are not limited to, one or any combination of a volatile and/or non-volatile memory, a volatile and/or non-volatile memory device, a compact disc (CD), a digital versatile disc (DVD), a read-only memory (ROM), a random-access memory (RAM), a FLASH drive, a floppy disk, a Synchronous Dynamic Random Access Memory (SDRAM), a Dynamic Random Access Memory (DRAM), a RAMBUS Dynamic Random Access Memory (RDRAM) a programmable ROM (PROM), an electronically-programmable ROM (EPROM), an electronically-erasable PROM (EEPROM), a solid state (SS) memory, a solid state disk (SSD), an optical storage disk, an optical storage device, a magnetic storage disk, a network-attached storage (NAS) device, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms can be correspondingly modified.

Further, in this specification and the appended claims, the singular forms "a," "an" and "the" do not exclude the plural reference unless the context clearly dictates otherwise. Moreover, conjunctions such as "and," "or," and "and/or"

are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A radar apparatus for a small unmanned aerial vehicle (UAV), the radar apparatus comprising:
   a transmitter to transmit a transmit signal in the X-band;
   a receive phased array including at least two receive antennas, wherein the receive phased array provides a field-of-view of at least 100 degrees in a first direction and at least 20 degrees in a second direction perpendicular to the first direction;
   a first processor programmed to determine a location of an object based on an output from each of the at least two antennas;
   a second processor programmed to perform collision avoidance based on the location of the object;
   a mount to mechanically couple the radar apparatus to the UAV; and
   a clutter reducer programmed to:
      receive first samples of a time-domain signal, the time-domain signal received from one of the at least two receive antennas;
      form an autocorrelation sequence for the received first samples;
      convert the autocorrelation sequence to a set of coefficients using the Levinson algorithm; and
      filter second samples of the time-domain signal using the set of coefficients.

2. The radar apparatus of claim 1, wherein the receive phased array is a digitally-steered receive phased array capable of simultaneously forming a first beam in a first receive direction and a second beam in a second receive direction.

3. The radar apparatus of claim 1, wherein the receive phased array is a four-channel receive phased array having four receive antennas.

4. The radar apparatus of claim 1, wherein the first processor and the second processor are implemented by the same integrated circuit.

5. The radar of apparatus claim 1, wherein the UAV weighs less than 25 kilograms.

6. The radar of apparatus claim 1, wherein the UAV is a consumer good.

7. The radar of apparatus claim 1, wherein the transmit signal comprises a frequency modulated continuous wave (FMCW) signal.

8. The radar apparatus of claim 7, wherein the second processor is programmed to enable a user to change a transmission characteristic of the FMCW signal.

9. The radar apparatus of claim 1, wherein one of the at least two receive antennas includes a printed circuit board antenna.

10. The radar apparatus of claim 1, wherein one of the at least two receive antennas includes an endfire Vivaldi antenna.

11. The radar apparatus of claim 1, wherein one of the at least two receive antennas has an aerodynamic profile.

12. The radar apparatus of claim 1, wherein the radar apparatus comprises a homodyne system including:
   a receive mixer to down convert a received signal; and
   a Wilkinson power divider to direct a portion of the transmit signal to the receive mixer, wherein the receive mixer down converts the received signal based on the portion of the transmit signal.

13. The radar apparatus of claim 1, further comprising a coupling rejection filter comprising a two-pole high-pass filter configured to adjust signals received by the radar apparatus for two targets at different distances to have generally the same received powers.

14. The radar apparatus of claim 1, wherein the second processor is programmed to perform real-time target tracking, and to perform the collision avoidance in real-time.

15. A radar apparatus for a small unmanned aerial vehicle (UAV), the radar apparatus comprising:
   a transmitter to transmit a transmit signal using a carrier signal having a frequency in the X-band;
   a digitally-steered receive phased array having four receive antennas, one of the receive antennas having a conductor with a dimension based on at least one-half the wavelength of the carrier signal;
   a first processor programmed to determine a location of an object based on outputs of the four receive antennas;
   a second processor programmed to perform collision avoidance based on the location of the object;
   a mount to mechanically couple the radar apparatus to the UAV; and
   a clutter reducer programmed to:
      receive first samples of a time-domain signal, the time-domain signal received from one of the four receive antennas;
      form an autocorrelation sequence of the received first samples;
      convert the autocorrelation sequence to a set of coefficients using the Levinson algorithm; and
      filter second sample of the time-domain signal using the set of coefficients.

16. The radar apparatus of claim 15, wherein the radar apparatus comprises a homodyne system including:
   a receive mixer to down convert a received signal; and
   a Wilkinson power divider to direct a portion of the transmit signal to the receive mixer, wherein the receive mixer down converts the received signal based on the portion of the transmit signal.

17. The radar apparatus of claim 16, wherein the one of the receive antennas comprises an endfire Vivaldi antenna, and has a field-of-view of at least 100 degrees in a first direction and at least 20 degrees in a second direction perpendicular to the first direction.

* * * * *